(12) United States Patent
Sasaki et al.

(10) Patent No.: US 11,731,848 B2
(45) Date of Patent: Aug. 22, 2023

(54) MEDIUM TRANSPORT APPARATUS AND PROCESSING APPARATUS

(71) Applicant: SEIKO EPSON CORPORATION, Tokyo (JP)

(72) Inventors: Keisuke Sasaki, Matsumoto (JP); Shinji Kanemaru, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 255 days.

(21) Appl. No.: 17/130,539

(22) Filed: Dec. 22, 2020

(65) Prior Publication Data

US 2021/0198064 A1 Jul. 1, 2021

(30) Foreign Application Priority Data

Dec. 26, 2019 (JP) ................................ 2019-235892

(51) Int. Cl.

| | |
|---|---|
| *B65H 11/02* | (2006.01) |
| *B65H 1/04* | (2006.01) |
| *B65H 5/06* | (2006.01) |
| *G03G 15/00* | (2006.01) |
| *B41J 11/00* | (2006.01) |

(52) U.S. Cl.
CPC ............ *B65H 5/06* (2013.01); *B41J 11/0045* (2013.01); *G03G 15/6529* (2013.01); *B65H 2801/03* (2013.01)

(58) Field of Classification Search
CPC .... B65H 2405/324; B65H 1/04; B65H 11/02; B65H 2405/111643; B65H 2405/11164; B65H 2407/21; B65H 5/06; B65H 2801/03; B41J 11/0045; G03G 15/6529
See application file for complete search history.

(56) References Cited

U.S. PATENT DOCUMENTS

| | | | | |
|---|---|---|---|---|
| 5,082,269 | A * | 1/1992 | Hirayama | ............ B65H 15/004 271/65 |
| 7,431,279 | B2 * | 10/2008 | Budelsky | ............... B41J 13/103 271/3.14 |
| 2015/0174923 | A1 | 6/2015 | Yamada et al. | |
| 2017/0108813 | A1 * | 4/2017 | Sato | .................. G03G 15/6514 |

FOREIGN PATENT DOCUMENTS

| | | |
|---|---|---|
| JP | 2015-120319 | 7/2015 |
| JP | 2017039582 A * | 2/2017 |

* cited by examiner

*Primary Examiner* — Luis A Gonzalez
(74) *Attorney, Agent, or Firm* — Workman Nydegger

(57) ABSTRACT

A medium transport portion includes a main body portion, a tray unit, and a support guide member. The main body portion includes a first manual feed path and a second manual feed path. The tray unit can be accommodated in the main body portion in a non-use state, and a medium is mounted thereon in a use state. The support guide member is movable in a Z-direction, and supports the tray unit such that a first position that the tray unit is positioned in the first manual feed path, a second position of being positioned in the second manual feed path, and a third position of being accommodated in the main body portion are switched.

10 Claims, 18 Drawing Sheets

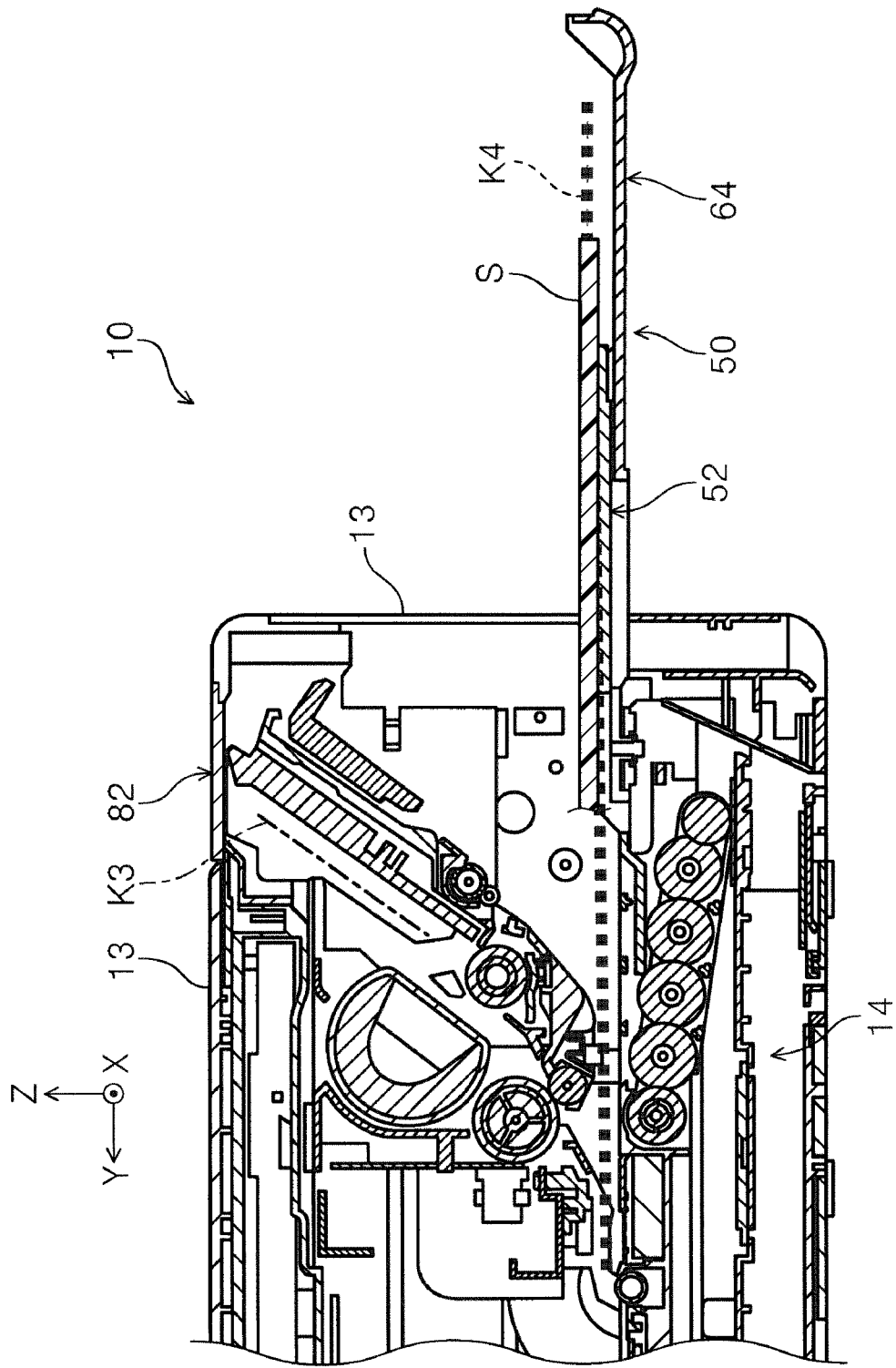

MEDIUM TRANSPORT APPARATUS AND PROCESSING APPARATUS

The present application is based on, and claims priority from JP Application Serial Number 2019-235892, filed Dec. 26, 2019, the disclosure of which is hereby incorporated by reference herein in its entirety.

BACKGROUND

1. Technical Field

The present disclosure relates to a medium transport apparatus that transports a medium and a processing apparatus that performs processing on a medium to be transported.

2. Related Art

A recording apparatus disclosed in JP-A-2015-120319 is configured such that a paper sheet reversing unit or a lens sheet feeding unit is attachable/detachable to/from an attachment portion, and when the lens sheet is linearly transported, the lens sheet feeding unit is attached to the attachment portion.

In a medium transport apparatus having a plurality of transport paths as in the recording apparatus disclosed in JP-A-2015-120319, when a mount portion on which a medium is mounted is provided integrally with the apparatus main body in accordance with each transport path, there is a risk that the medium transport apparatus will be increased in size.

SUMMARY

In order to solve the above problem, a medium transport apparatus according to an aspect of the present disclosure includes: an apparatus main body having a first transport path and a second transport path different each other in posture of a medium to be transported; a mount portion that is configured to be accommodated in the apparatus main body in a non-use state and on which a medium is mounted in a use state; and a supporting portion configured to support the mount portion such that the mount portion is provided in the apparatus main body so as to be configured to move in a height direction of the apparatus main body, and a first position that the mount portion is positioned in the first transport path, a second position that the mount portion is positioned in the second transport path, and a third position that the mount portion is accommodated in the apparatus main body are switched.

BRIEF DESCRIPTION OF THE DRAWINGS

FIG. 16 is a side cross-sectional view illustrating a state in which the second manual feed path allows paper to pass therethrough of the printer according to the first embodiment.

DESCRIPTION OF EXEMPLARY EMBODIMENTS

Figure 1:
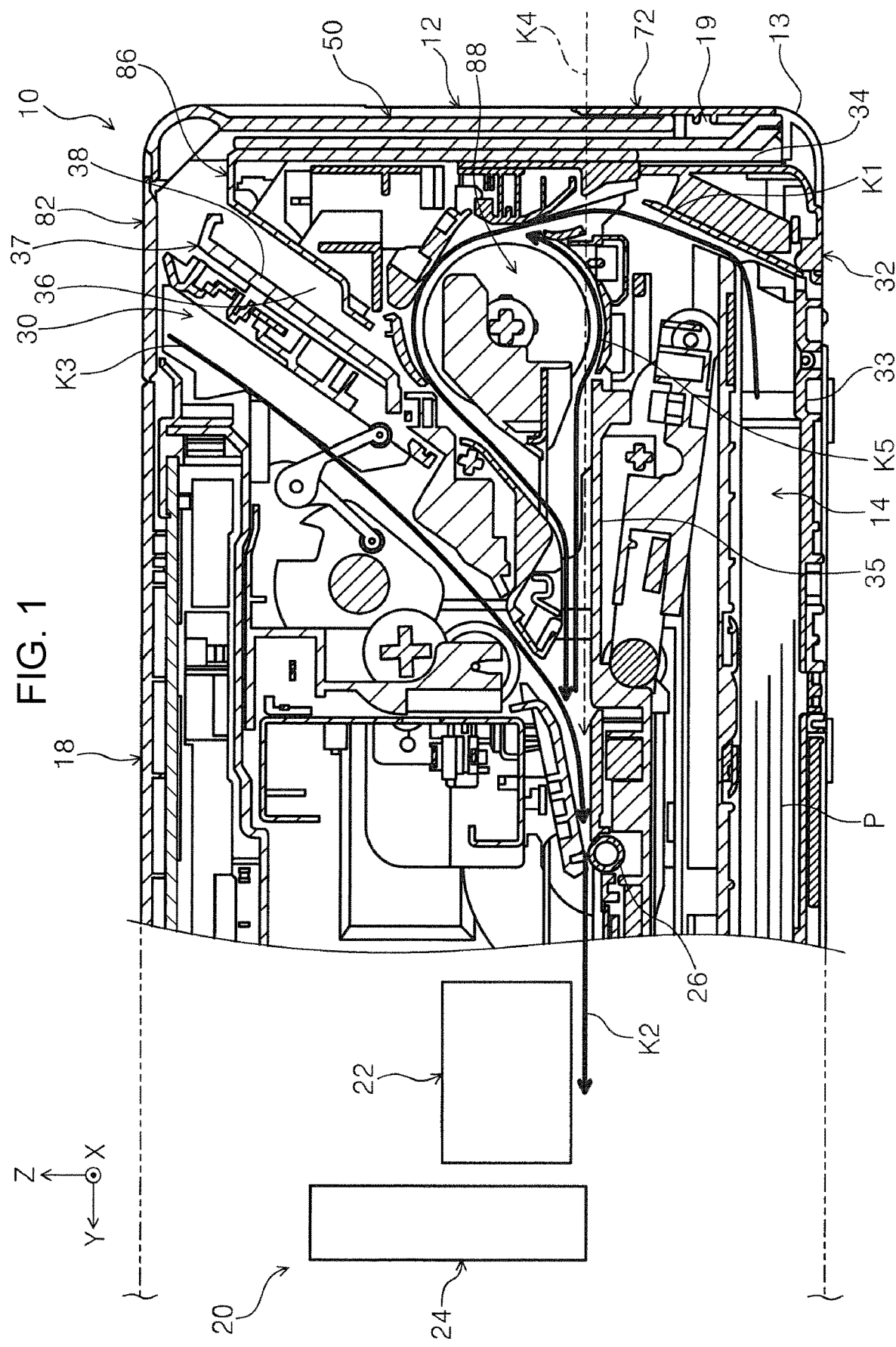
FIG. 1 is a side cross-sectional view illustrating an overall configuration of a printer according to a first embodiment.

Hereinafter, the present disclosure will be schematically described.

A medium transport apparatus according to a first aspect of the present disclosure in order to solve the above problem, includes: an apparatus main body having a first transport path and a second transport path different each other in posture of a medium to be transported; a mount portion that is configured to be accommodated in the apparatus main body in a non-use state and on which a medium is mounted in a use state; and a supporting portion configured to support the mount portion such that the mount portion is provided in the apparatus main body so as to be configured to move in a height direction of the apparatus main body, and a first position that the mount portion is positioned in the first transport path, a second position that the mount portion is positioned in the second transport path, and a third position that the mount portion is accommodated in the apparatus main body are switched.

According to the present aspect, by moving the supporting portion in the height direction, the mount portion is brought into a development state which is the use state from an accommodated state which is the non-use state, and a position of the mount portion in the height direction is changed. Furthermore, by turning or the like of the mount portion with respect to the supporting portion, the posture of the mount portion can be changed. This makes it possible to switch among the first position, the second position, and the third position of the supporting portion and the mount portion. This makes it possible to reduce the size of the medium transport apparatus in comparison with a configuration in which the mount portion is fixed to the apparatus main body at the second position.

In a medium transport apparatus according to a second aspect, in the first aspect, a reversing portion configured to be attached/detached to/from the apparatus main body, configured to form a reverse path configured to reverse a medium in an attached state to the apparatus main body, configured to cover the second transport path, and arranged on a path of turning of the mount portion is provided.

According to the present aspect, when the reversing portion is detached from the apparatus main body, since an obstacle on the path of the turning of the mount portion is eliminated, the mount portion can be provided in the second transport path. Furthermore, when the reversing portion is attached to the apparatus main body, since the turning of the mount portion is restricted by contact with the reversing portion, the mount portion cannot be provided in the second transport path.

That is, when one of the second transport path and the reverse path is usable, the other becomes unusable, and it is therefore possible to allow a user to recognize which of the second transport path and the reverse path is usable.

In a medium transport apparatus according to a third aspect, in the first aspect or the second aspect, the first transport path is positioned on an upper side relative to the second transport path in the height direction, the apparatus main body is provided with a cover member configured to open/close the first transport path, configured to cover the first transport path in a closed state, and positioned on a lower side in the height direction relative to the mount portion in an opened state, and the mount portion is configured to turn in the closed state of the cover member and is restricted in turning due to contact with the cover member in the opened state of the cover member.

According to the present aspect, when the cover member is in the opened state, the first transport path is opened and usable, and the turning of the mount portion is restricted by contact with the cover member arranged on the lower side relative to the mount portion, whereby the second transport path becomes unusable.

On the other hand, when the cover member is in the closed state, the first transport path is covered and unusable, and the turning of the mount portion is permitted, whereby the second transport path becomes usable.

That is, when one of the first transport path and the second transport path is usable, the other becomes unusable, and it is therefore possible to allow the user to recognize which of the first transport path and the second transport path is usable.

In a medium transport apparatus according to a fourth aspect, in any one of the first aspect to the third aspect, the mount portion is provided with a guiding portion configured to guide both left and right end portions of a medium in a transport direction in accordance with a width of the medium.

According to the present aspect, since both the left and right end portions of the medium are guided in the transport direction by the guiding portion, the direction in which the medium is transported can be stabilized as compared with a configuration without the guiding portion.

In a medium transport apparatus according to a fifth aspect, in any one of the first aspect to the fourth aspect, the mount portion is provided with an urging portion configured to urge a medium downstream in a transport direction.

According to the present aspect, since the medium is fed downstream in the transport direction by urging force received from the urging portion, it is possible to prevent transport failure that the medium stops in the middle of the transport path.

In a medium transport apparatus according to a sixth aspect, in any one of the first aspect to the fifth aspect, a permission portion configured to guide the supporting portion in the height direction and configured to permit movement of the supporting portion is formed at the apparatus main body.

According to the present aspect, the supporting portion is moved from the permission portion, whereby the mount portion can be taken out from the apparatus main body and a medium can be placed on the mount portion. The mount portion on which the medium is placed is provided in a transport path to be used by the supporting portion being inserted into the permission portion. As described above, since the mount portion is attachable/detachable to/from the apparatus main body, it is possible to make it easy for a user to perform an operation of mounting the medium on the mount portion.

In a medium transport apparatus according to a seventh aspect, in any one of the first aspect to the sixth aspect, the mount portion includes a base portion supported by the supporting portion and one or more extension/retraction portions configured to extend/retract from/to the base portion in a transport direction of a medium.

According to the present aspect, by extending the extension/retraction portion from the base portion, a region in which the medium can be mounted in the mount portion expands, and it is therefore possible to use a medium having a large size.

A processing apparatus according to an eighth aspect includes: the medium transport apparatus according to any one of the first aspect to the seventh aspect; and a processor configured to perform processing on the medium transported in one of the first transport path and the second transport path.

According to the present aspect, it is possible to obtain the same actions and effects as those of the medium transport apparatus according to any one of the first aspect to the seventh aspect.

First Embodiment

Hereinafter, a first embodiment as one embodiment of a medium transport apparatus and a processing apparatus according to the present disclosure will be described in detail with reference to the accompanying drawings. In an X-Y-Z coordinate system illustrated in each drawing, in a printer 10, which will be described later, the X-axis direction represents an apparatus width direction, the Y-axis direction represents an apparatus depth direction, and the Z-axis direction represents an apparatus height direction.

In the apparatus width direction, when the left side and the right side when viewed from the front surface side are distinguished from each other, the right side is referred to as a +X side, and the left side is referred to as a −X side. In the apparatus depth direction, when the front side and the back surface side are distinguished from each other, the front side is referred to as a +Y side, and the back surface side is referred to as a −Y side. In the apparatus height direction, when the upper side and the lower side are distinguished from each other, the upper side is referred to as a +Z side, and the lower side is referred to as a −Z side.

FIG. 1 illustrates the printer 10 as an example of a processing apparatus and a recording apparatus. The printer 10 records various kinds of information on a paper sheet P or a sheet S (FIG. 16) as an example of a medium. The various kinds of information recorded on the paper sheet P include character information and image information.

The paper sheet P is, as an example, plain paper. The sheet S is, as an example, configured as a plate material having a larger thickness than the paper sheet P and made of a resin, and has a recessed portion (not illustrated) formed therein. The recessed portion is, as an example, formed such that a DVD (Digital Versatile Disc) in which information is recorded is placed thereon.

Furthermore, the printer 10 includes a main body portion 12 as an example of an apparatus main body, a scanner portion 18, an information recorder 20 as an example of a processor, and a medium transport portion 30 as an example of a medium transport apparatus. Part of the medium transport portion 30 constitutes a section on the −Y side relative to the center of the main body portion 12. In the printer 10, the same actions and effects as those of the medium transport portion 30, which will be described later, are obtained.

The main body portion 12 is configured to include a housing 13 in which the respective portions constituting the printer 10 are stored, a storing portion 14 in which the paper sheet P is stored, an operation panel (not illustrated), and a main body frame 32, which will be described later.

The housing 13 is configured to include a side wall 15 (FIG. 2) that constitutes an outer circumferential surface of the printer 10, and is formed in a hollow box shape. A plurality of paths, which will be described later, for transporting the paper sheet P or the sheet S is formed inside the housing 13. Furthermore, at a −Y side end portion of the housing 13, an accommodation portion 19 for accommodating a tray unit 50, which will be described later, is formed. The accommodation portion 19 is a section that is formed in a box shape that opens toward the +Z side.

Figure 2:
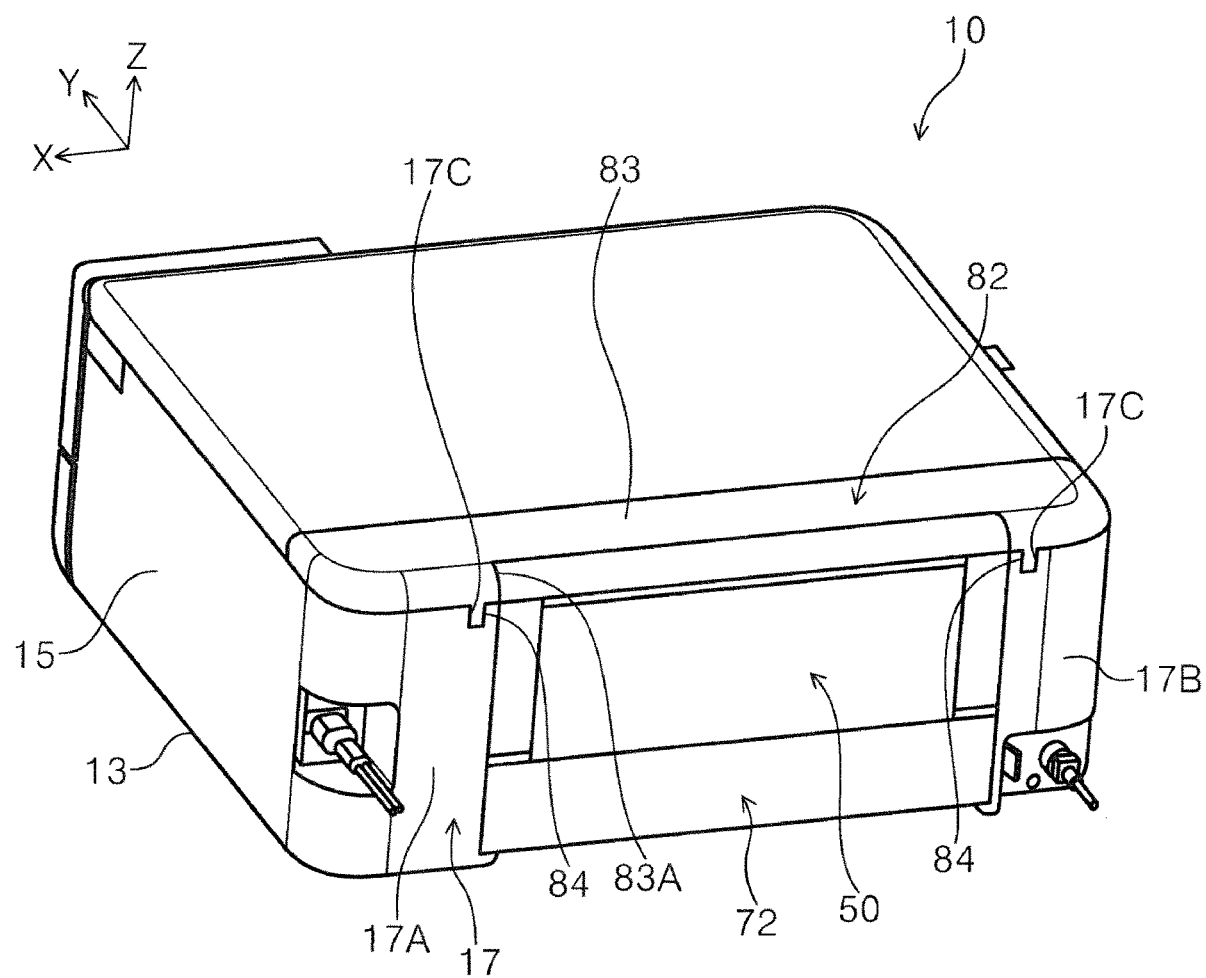
FIG. 2 is a perspective view of the printer according to the first embodiment when viewed from the back surface side.

As illustrated in FIG. 2, a rear wall 17 constituting a −Y side section of the side wall 15 is discontinuous by the center section in the X-axis direction being removed in a rectangular shape. That is, the rear wall 17 is divided into a right rear wall 17A constituting the +X side and a left rear wall 17B constituting the −X side. On +Z side end portions of the right rear wall 17A and the left rear wall 17B, attached portions 17C to each of which a hinge portion 84 (FIG. 15A) of a cover member 82, which will be described later, is attached, are respectively formed.

Path for Transporting Paper Sheet and Others

As illustrated in FIG. 1, in the printer 10, in an attached state of a reversing unit 86, which will be described later, paths through which the paper sheet P or the sheet S is transported are formed. Specifically, the main body portion 12 includes a first path K1, a second path K2, a first manual feed path K3, a second manual feed path K4, and a reverse path K5. Each of the paths is configured to include a plurality of rollers and guide members (not illustrated).

The paper sheet P can be transported through all the above-described paths. The sheet S can be transported only through the second path K2 and the second manual feed path K4.

The first path K1 progresses from a −Y side end portion of the storing portion 14 toward the +Z side, and extends to a transport roller 26, which will be described later, via an outer circumferential surface of a reversing roller 88, which will be described later, on the +Z side. A section from the reversing roller 88 to the transport roller 26 in the first path K1 is formed in a linear shape along the Y-axis direction. In this linear shaped section, the paper sheet P or the sheet S is supported by a lower wall 35 that constitutes a path lower portion.

The second path K2 linearly extends from the transport roller 26 to the +Y side along the Y-axis direction via the −Z side relative to a head 22, which will be described later.

The first manual feed path K3 is an example of a first transport path, and extends obliquely downward from a section on the −Y side and the +Z side relative to the center of the main body portion 12 to the transport roller 26. Furthermore, the first manual feed path K3 becomes usable by making the cover member 82, which will be described later, an opened state.

The second manual feed path K4 is an example of a second transport path, and linearly extends along the Y-axis direction from a section on the −Y side relative to the center of the main body portion 12 toward the +Y side to the transport roller 26. Furthermore, the second manual feed path K4 is a path that becomes usable by detaching the reversing unit 86, which will be described later, from the main body portion 12 and attaching the tray unit 50, which will be described later, in a posture along the Y-axis direction.

The first manual feed path K3 is positioned on an upper side (+Z side) relative to the second manual feed path in the Z-axis direction.

The reverse path K5 is formed by the reversing unit 86 being attached to the main body portion 12. Furthermore, the reverse path K5 has a linear portion from the transport roller 26 to the reversing roller 88 and a curved line portion which merges with the first path K1 from a −Y side end of the linear portion via the outer circumferential surface of the reversing roller 88 on the −Z side. In the present embodiment, the linear portion of the reverse path K5 also serves as part of the second manual feed path K4.

Information Recorder

The information recorder 20 records information on the paper sheet P or the sheet S based on reception information such as information of a document read by the scanner portion 18, information input from the outside, and the like. Furthermore, the information recorder 20 performs recording processing of the information on the paper sheet P or the sheet S being transported through one of the first manual feed path K3 and the second manual feed path K4.

Specifically, the information recorder 20 is configured to include the head 22 and a control unit 24. The control unit 24 controls an operation of each portion of the printer 10.

The head 22 is an example of a processor and a recorder, and is configured as a so-called ink jet system recording head that records various kinds of information on the paper sheet P or the sheet S as an example of processing, by discharging ink as an example of liquid onto the paper sheet P or the sheet S.

On the −Y side and the −Z side relative to the head 22, the transport roller 26 for transporting the paper sheet P or the sheet S toward the head 22 is provided.

The control unit 24 is configured to include a CPU (Central Processing Unit), a ROM (Read Only Memory), a RAM (Random Access Memory), and a storage (not illustrated). Furthermore, the control unit 24 is configured so as not only to perform the operation control of the head 22 but also to control the transport of the paper sheet P or the sheet S in the printer 10. Furthermore, the control unit 24 controls various operations in the printer 10 based on information input through the above-described operation panel.

Medium Transport Portion

The medium transport portion 30 includes the main body frame 32, the tray unit 50 as an example of a mount portion, and a support guide member 72 as an example of a supporting portion. Furthermore, the medium transport portion 30 is provided with the cover member 82 and the reversing unit 86 as an example of a reversing portion. The main body frame 32 is included in an example of the apparatus main body.

Main Body Frame

The main body frame 32 is provided in the housing 13. Specifically, the main body frame 32 is configured to include a bottom wall 33, a vertical wall 34, the lower wall 35, a pair of side walls 36, and a guide frame 37. The bottom wall 33 constitutes a bottom wall of the housing 13, is formed in a plate shape which takes the Z-axis direction as a thickness direction, and expands along the X-Y plane. Furthermore, as described above, the main body frame 32 has the first manual feed path K3 and the second manual feed path K4 which are different in posture of the paper sheet P or the sheet S to be transported.

The vertical wall 34 stands upright in the Z-axis direction at a –Y side end portion of the bottom wall 33. Furthermore, the vertical wall 34 is formed in a plate shape which takes the Y-axis direction as a thickness direction, and is formed in a rectangular shape long in the X-axis direction and short in the Z-direction. The height of the vertical wall 34 in the Z-axis direction is, as an example, substantially ⅓ the height of the housing 13 in the Z-axis direction. Furthermore, the vertical wall 34 is positioned so as to be adjacent to a –Z side end portion of the tray unit 50, which will be described later, on the +Y side, and is made to restrict movement and turning of the tray unit 50 by making contact with the tray unit 50 in an accommodated state.

The lower wall 35 is arranged at a position on the +Z side relative to the storing portion 14, on the –Y side relative to the lower surface of the head 22, and on the +Y side relative to the vertical wall 34. Furthermore, the lower wall 35 is formed in a plate shape which takes the Z-axis direction as a thickness direction, and expands along the X-Y plane.

The side walls 36 are each formed in a plate shape which takes the X-axis direction as a thickness direction, are arranged with an interval on the +X side and the –X side relative to the center in the X-axis direction at a section on the –Y side relative to the center in the housing 13, and stands upright in the Z-axis direction. The reversing unit 86, which will be described later, is arranged between the pair of side walls 36.

Figure 6:
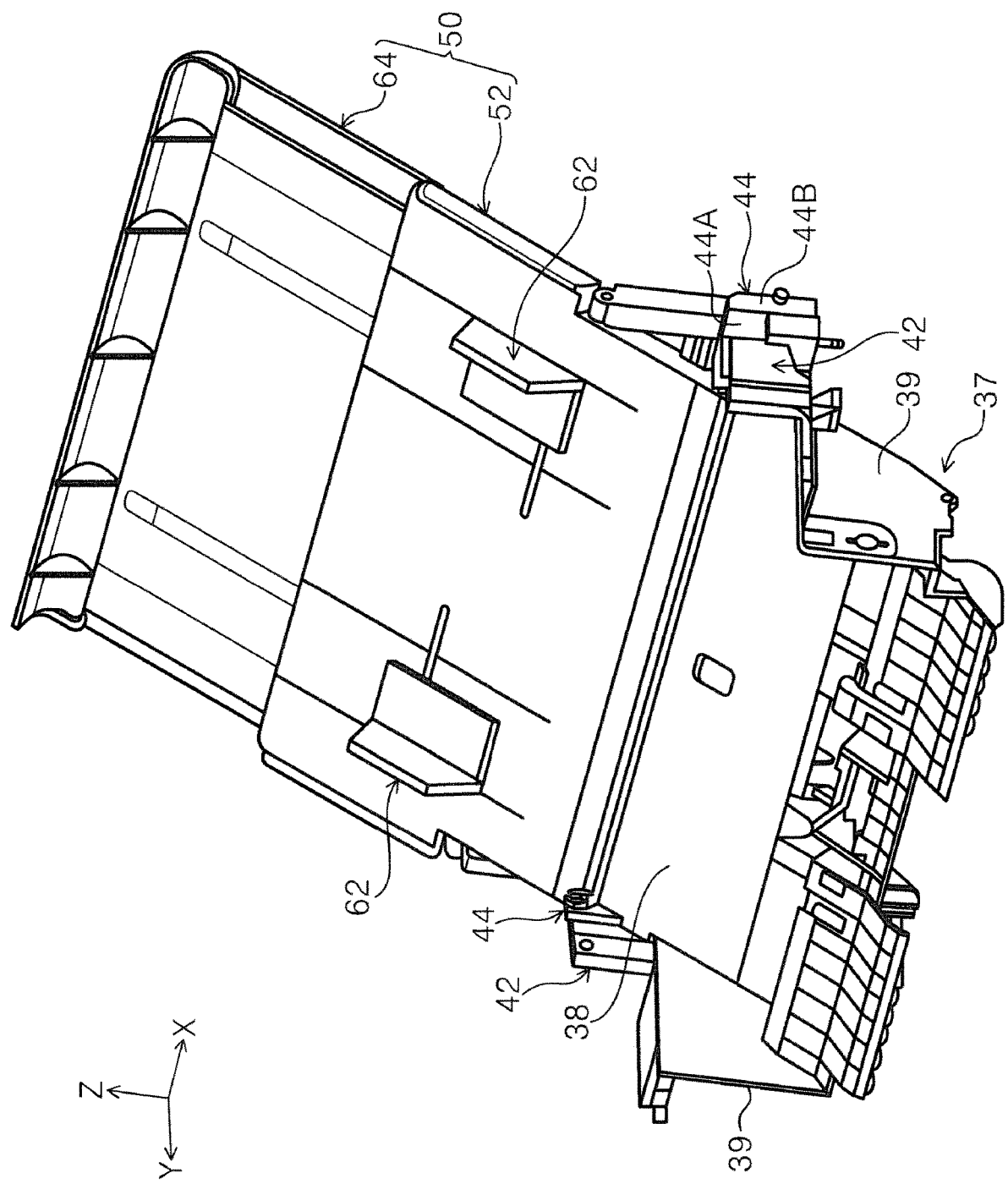
FIG. 6 is a perspective view illustrating a frame member and the tray unit of the printer according to the first embodiment.

As illustrated in FIG. 6, in the guide frame 37, as an example, one tilt wall 38, a pair of left and right side walls 39, a pair of left and right engaged portions 42, and a pair of left and right rail guide portions 44 are formed.

The tilt wall 38 is formed in a plate shape, and is tilted toward a front lower side such that a +Y side end portion is positioned on the –Z side relative to a –Y side end portion. Furthermore, the tilt wall 38 defines a space portion in which the reversing unit 86 (FIG. 1) is arranged and a space portion which serves as the first manual feed path K3 (FIG. 1), in the Y-axis direction. The width of the tilt wall 38 in the X-axis direction is wider than the width of the paper sheet P in the X-axis direction.

The pair of side walls 39 are positioned at both end portions of the tilt wall 38 in the X-axis direction, and are formed in a plate shape along the Y-Z plane. Note that the pair of side walls 39 are arranged on the inner side in the X-axis direction relative to the pair of side walls 36 (FIG. 1).

Figure 7:
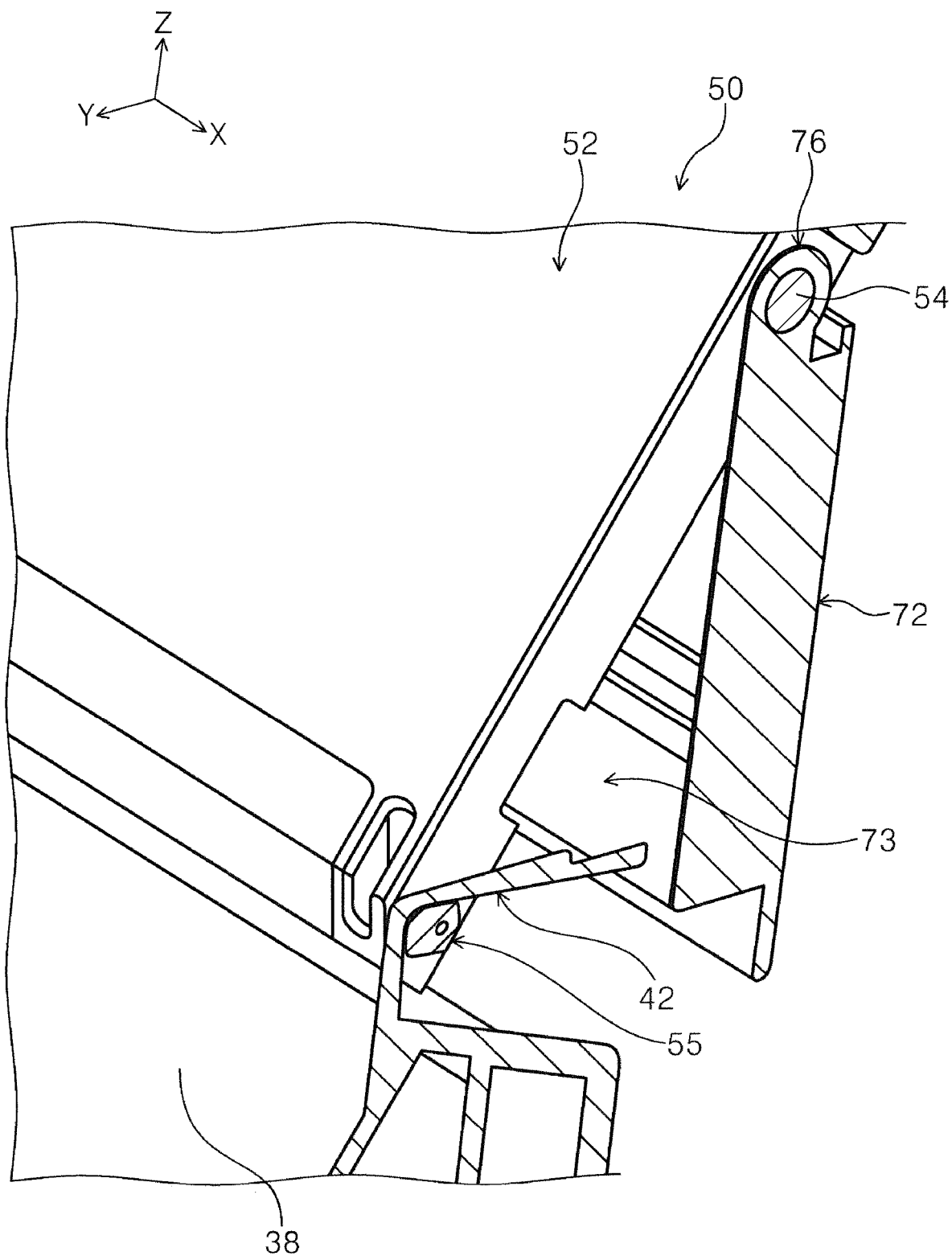
FIG. 7 is a partial enlarged perspective view illustrating an engaging section between the frame member and the tray unit of the printer according to the first embodiment.

As illustrated in FIG. 7, the engaged portions 42 are formed at both end portions in the X-axis direction of a +Z side end portion of the tilt wall 38. Furthermore, the engaged portions 42 each protrude toward the +Z side more than the +Z side end of the tilt wall 38. Furthermore, the engaged portions 42 each have a U-shaped cross-sectional shape that is open toward the –Y side when viewed from the X-axis direction.

Figure 8:
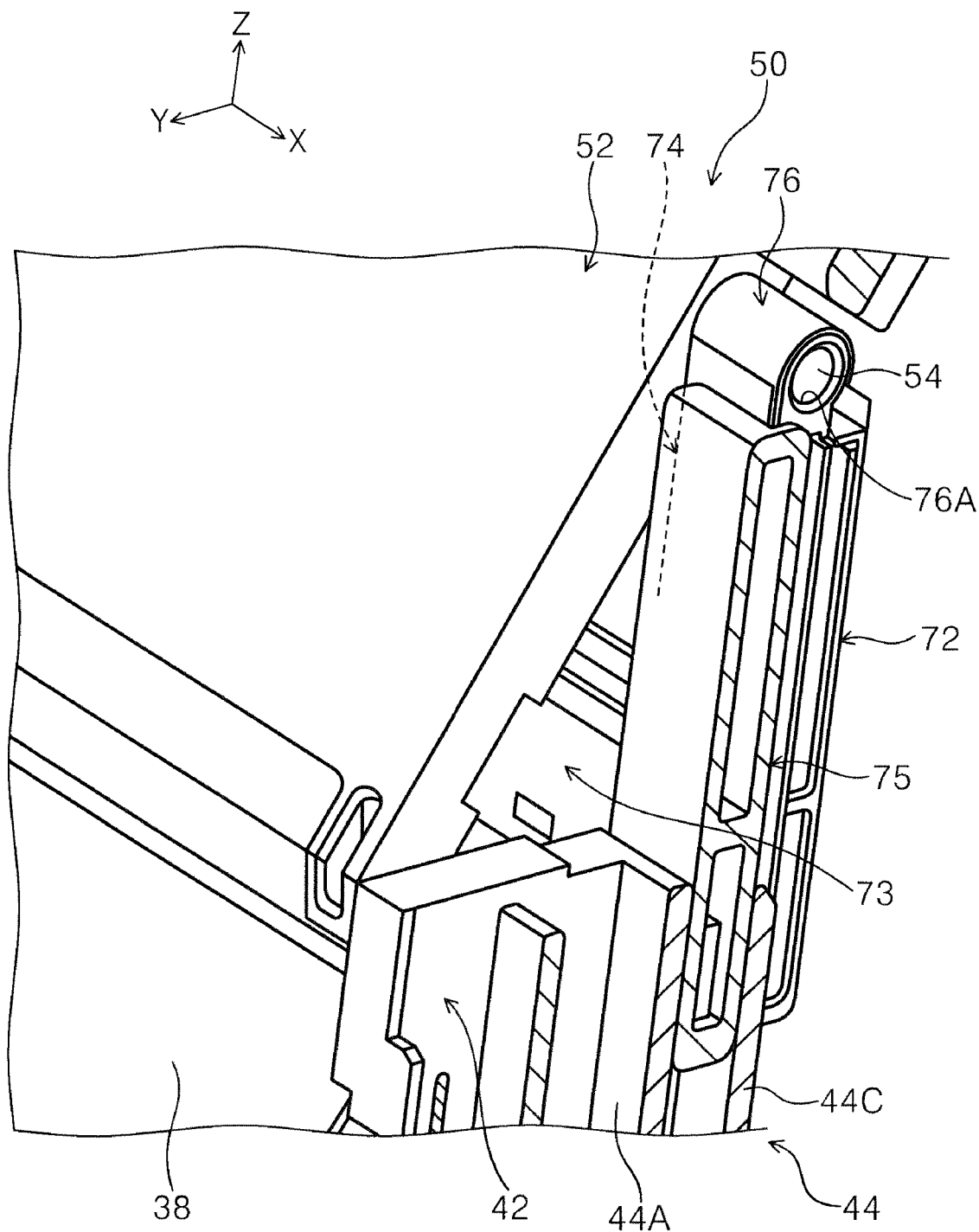
FIG. 8 is a partial enlarged perspective view illustrating the engaging section between the frame member and the tray unit of the printer according to the first embodiment.

The rail guide portion 44 illustrated in FIG. 8 is an example of a permission portion. Furthermore, the rail guide portion 44 is a section formed continuously with the engaged portion 42 on the outer side in the X-axis direction relative to the engaged portion 42, and guides a rail portion 75, which will be described later, in the Z-axis direction and permits the movement of the rail portion 75. Specifically, the rail guide portion 44 is configured so as to open toward the +Z side and the inner side in the X-axis direction, and has a front wall 44A, a side wall 44B (FIG. 6), and a rear wall 44C. The side wall 44B restricts movement of the rail portion 75 toward the outside in the X-axis direction.

The front wall 44A and the rear wall 44C are arranged along the X-Z plane, face each other with an interval in the Y-axis direction, and extend in the Z-axis direction. The interval in the Y-axis direction between the front wall 44A and the rear wall 44C is narrower at a +Z side portion than in the center portion and a lower portion (–Z side portion) in the Z-axis direction. Accordingly, in the center portion and the lower portion of the rail guide portion 44 in the Z-axis direction, the front wall 44A and the rear wall 44C guide the rail portion 75 in the Z-direction. Furthermore, an upper portion (+Z side end portion) of the rail guide portion 44 in the Z-axis direction is configured such that the rail portion 75 is not easily separated by pinching the rail portion 75 by the front wall 44A and the rear wall 44C.

On the upper portion of the rail guide portion 44 in the Z-axis direction, by external force acting on the rail portion 75 and the rail portion 75 being pulled up toward the +Z side, the rail portion 75 is moved from the rail guide portion 44. That is, the rail portion 75 is permitted to move. Note that since the interval of the +Z side end portion of the rail guide portion 44 in the Y-axis direction is reduced, pressing force in the Y-axis direction acts the lower portion of the rail portion 75 pulled up toward the +Z side. Accordingly, in the pulled-up state, the rail portion 75 is configured to be held by the upper portion of the rail guide portion 44.

Tray Unit

Figure 9:
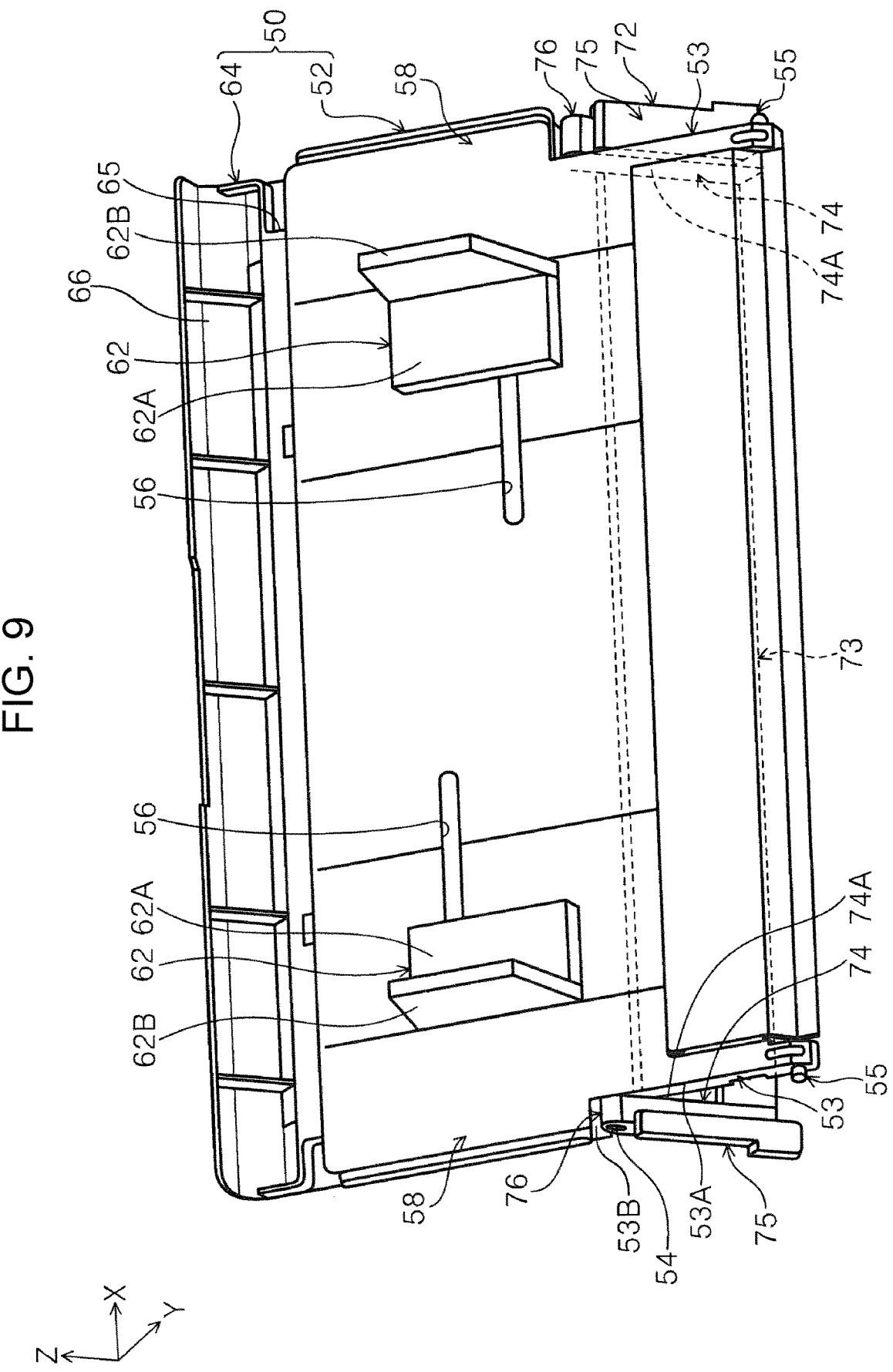
FIG. 9 is a perspective view of the tray unit of the printer according to the first embodiment.

The tray unit 50 illustrated in FIG. 9 includes a first support member 52 as an example of a base portion, and a second support member 64 as an example of an extension/retraction portion. When the arrangement of respective portions of the tray unit 50 is described, the description will be given by assuming that the tray unit 50 is in a state of standing upright along the X-Z plane.

The first support member 52 is formed in a rectangular plate shape that is long in the X-axis direction. The width of the first support member 52 in the X-axis direction is wider than the width of the paper sheet P in the X-axis direction. In the first support member 52, as an example, cutout portions 53, shaft portions 54, engaging portions 55, slits 56, and support member supporting portions 58 are formed. Furthermore, in the first support member 52, edge guides 62 as an example of a guiding portion are provided. As an example, since these components are left-right symmetrically arranged with respect to a virtual line passing through the center in the X-axis direction and along the Z-axis direction, only one of the left and right sides will be described, and the description on the other side will be omitted.

The cutout portion 53 is formed in an L-shape at the −Z side section relative to the center in the Z-axis direction at both end portions of the first support member 52 in the X-axis direction. Specifically, the cutout portion 53 has a side surface 53A as an end surface in the X-axis direction, and a side surface 53B as an end surface in the Z-axis direction.

Figure 10:
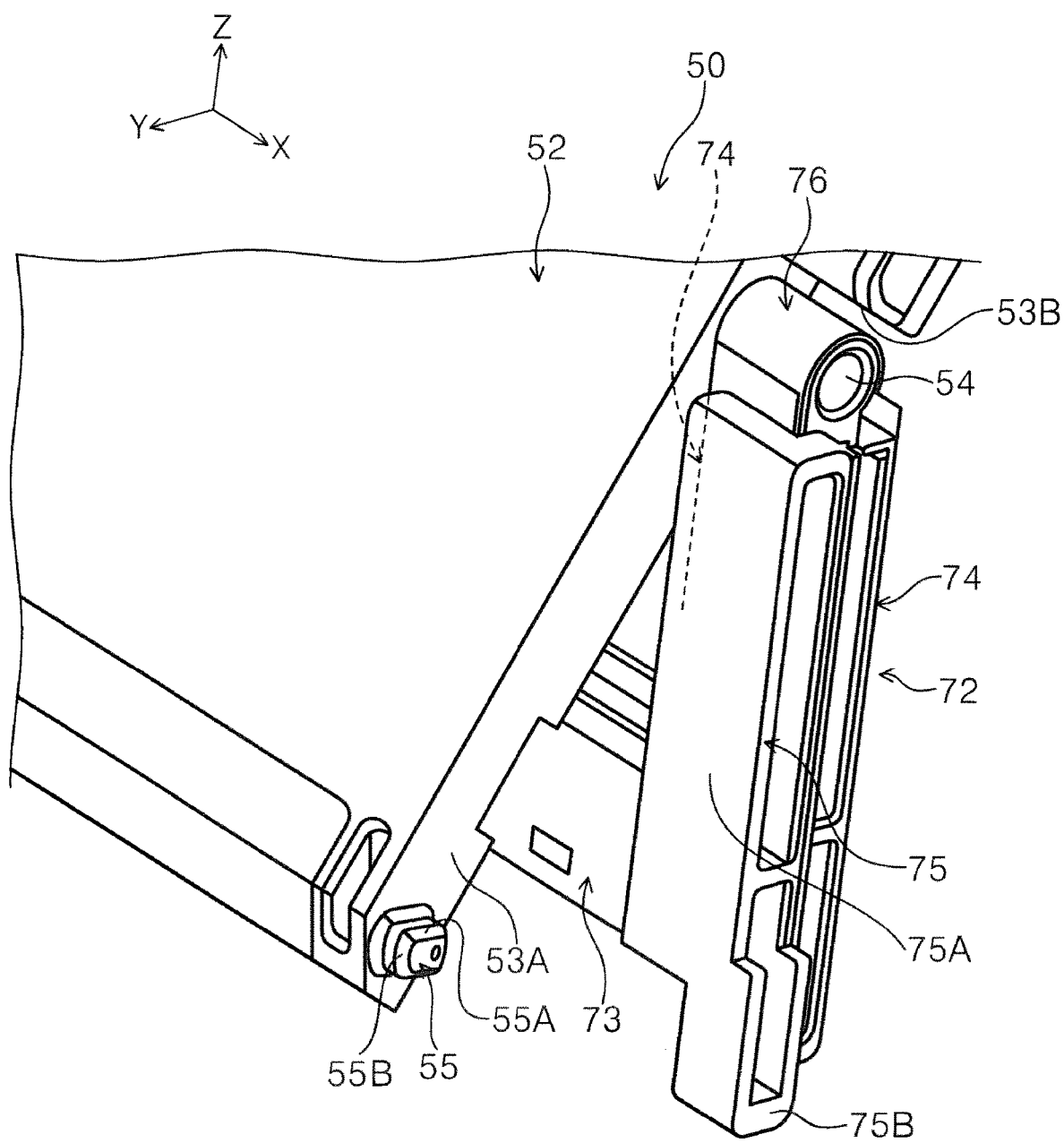
FIG. 10 is a partial enlarged perspective view of the tray unit of the printer according to the first embodiment.

The shaft portion 54 illustrated in FIG. 10 protrudes outward in the X-axis direction from a +Z side end portion of the side surface 53A. Furthermore, the shaft portion 54 is formed in a circular column shape which takes the X-axis direction as the axis direction, and is rotatably supported by an annular portion 76 of the support guide member 72, which will be described later. As a result, the first support member 52 is made to be turnable with respect to the support guide member 72.

The engaging portion 55 protrudes outward in the X-axis direction from a −Z side end portion of the side surface 53A. Furthermore, in a tilted state of the tray unit 50, the engaging portion 55 has a plane surface portion 55A along the X-Y plane and a curved surface portion 55B protruding in the Y-axis direction. Additionally, in the tilted state of the tray unit 50, the engaging portion 55 is configured to be inserted into the above-described engaged portion 42 (FIG. 7) from the −Y side, and be engaged with the engaged portion 42.

The two slits 56 illustrated in FIG. 9 each extend long in the X-axis direction, and are arranged with an interval in the X-axis direction and such that the positions in the Z-axis direction are shifted to each other.

The edge guide 62 is, as an example, arranged along the surface of the first support member 52, and has a slide plate 62A guided in the X-axis direction by the slit 56, and a movable plate 62B coupled to an end portion of the slide plate 62A in the X-axis direction using a hinge portion (not illustrated). The hinge portion takes the Z-axis direction as an axis direction.

The two slide plates 62A are configured so as to be capable of mutually approaching or separating in the X-axis direction by a moving mechanism formed of a pinion and a rack (not illustrated).

The movable plate 62B is made to be in an accommodated state of overlapping with the slide plate 62A in the Y-axis direction when not being used. In addition, the movable plate 62B is, when being used, made to stand upright so as to be orthogonal to the slide plate 62A, and guides an end portion of the paper sheet P in the X-axis direction, in the transport direction of the paper sheet P. As described above, the edge guides 62 are configured so as to guide both the left and right end portions of the paper sheet P in the X-axis direction, in the transport direction in accordance with the width (medium width) of the paper sheet P.

Figure 5:
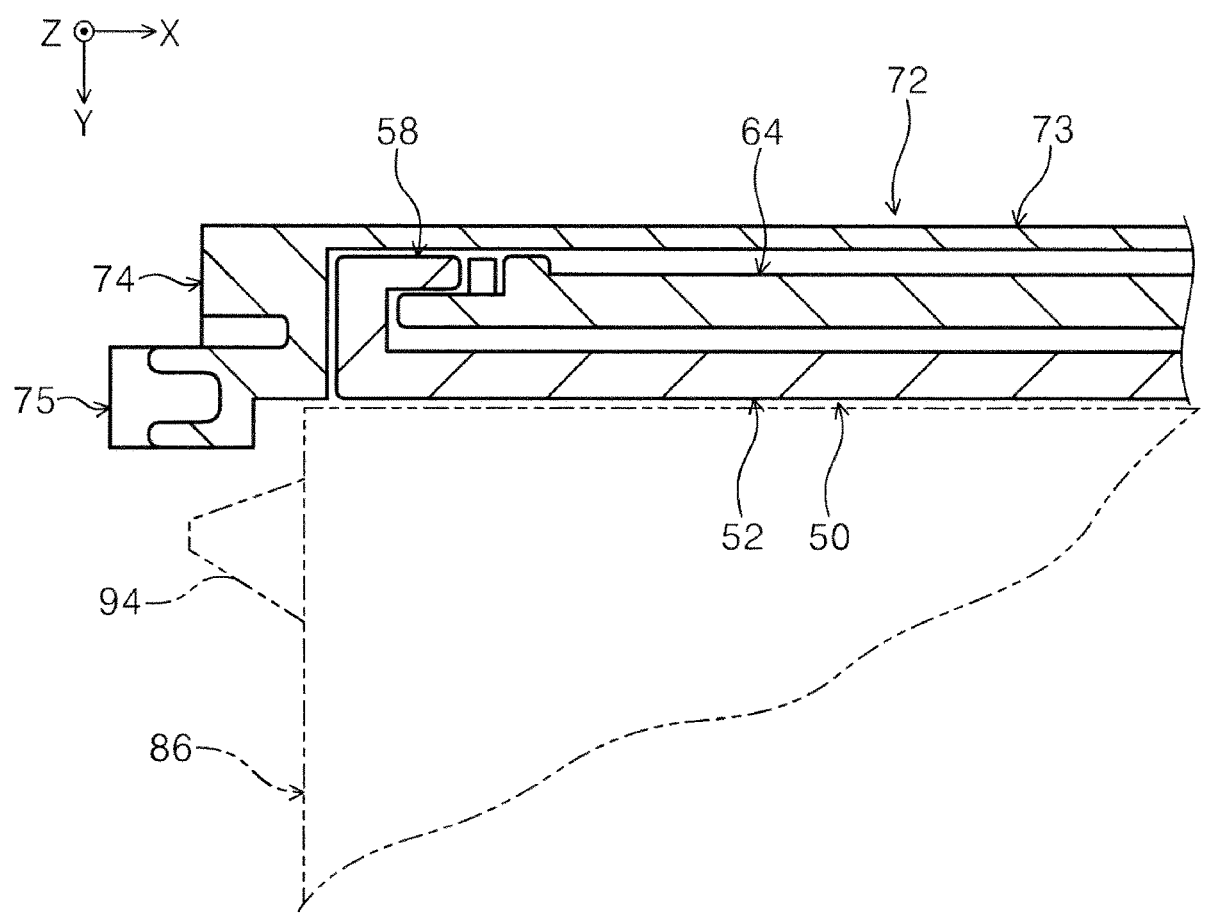
FIG. 5 is a transverse cross-sectional view illustrating arrangement of the reversing unit and a tray unit of the printer according to the first embodiment.

As illustrated in FIG. 5, the support member supporting portion 58 is formed as a groove having a U-shaped cross-section that is open in the X-axis direction when viewed from the Z-axis direction. In addition, the support member supporting portion 58 extends in the Z-axis direction. As a result, the support member supporting portions 58 are configured so as to guide, in the Z-axis direction, both end portions of the second support member 64 in the X-axis direction. In other words, the second support member 64 is configured so as to be extended/retracted from/to the first support member 52 in the transport direction of the paper sheet P. Note that in the support member supporting portion 58, an engaged portion (not illustrated) that holds the second support member 64 in a pulled-out state is formed.

As illustrated in FIG. 9, the second support member 64 has, as an example, a plate portion 65 having a narrower width in the X-axis direction than that of the first support member 52, and a curved portion 66 formed at a +Z side end portion of the plate portion 65.

The plate portion 65 is formed in a rectangular shape that is long in the X-axis direction. Furthermore, both end portions of the plate portion 65 in the X-axis direction are respectively inserted in the support member supporting portions 58, and are configured to be guided in the Z-axis direction by the support member supporting portions 58. At a −Z side end portion of the plate portion 65, an engaging portion (not illustrated) that engages with the first support member 52 in a state where the plate portion 65 is pulled out toward the +Z side relative to the first support member 52 is formed.

The curved portion 66 is arranged at an upper corner portion of the housing 13 in a state where the tray unit 50 is accommodated in the accommodation portion 19. Furthermore, the curved portion 66 functions as a grip portion when the second support member 64 is pulled out.

Here, the tray unit 50 illustrated in FIG. 1 can be accommodated in the accommodation portion 19 in an upright state along the Z-axis direction. Additionally, the tray unit 50 is configured so as to function as a rear wall that covers the −Y side section of the main body portion 12 in an accommodated state in the accommodation portion 19. The accommodated state of the tray unit 50 means a non-use state in which the tray unit 50 is not used. In addition, the tray unit 50 is configured such that the paper sheet P is mounted thereon, in a development state of being pulled out from the accommodation portion 19 toward the +Z side and being tilted relative to the Z-axis direction. The development state of the tray unit 50 means a use state in which the tray unit 50 is used. The paper sheet P mounted on the tilted tray unit 50 is fed to the first manual feed path K3.

Furthermore, the tray unit 50 is configured so as to be capable of turning around the center axis of the shaft portion 54 (FIG. 7), in a closed state of the cover member 82, which will be described later. Furthermore, the tray unit 50 is configured so as to be restricted in turning around the center axis of the shaft portion 54, in an opened state of the cover member 82, by making contact with the cover member 82 in the Z-axis direction.

Support Guide Member

The support guide member 72 illustrated in FIG. 9 includes, when viewed from the Y-axis direction, a vertical plate portion 73 having a rectangular shape long in the X-axis direction, and restriction portions 74, the rail portions 75, and the annular portions 76 respectively formed at both end portions of the vertical plate portion 73 in the X-axis direction. Furthermore, the support guide member 72 can be accommodated in the accommodation portion 19 (FIG. 1) together with the tray unit 50. Additionally, the support guide member 72 is provided so as to be movable in the Z-axis direction, which is the height direction, in the main body portion 12 (FIG. 1).

Note that although portions constituting the support guide member 72 are partially formed asymmetrically with respect to the center in the X-axis direction, in order to make the configuration easy to understand here, the portions will be described as left-right symmetrical sections. Each portion of the support guide member 72 may be formed as a section asymmetric with respect to the center in the X-axis direction.

The vertical plate portion 73 is arranged in a state of standing upright in the Z-axis direction. The length of the vertical plate portion 73 in the X-axis direction is longer than the length of the first support member 52 in the X-axis direction excluding the cutout portion 53. Furthermore, the length of the vertical plate portion 73 in the Z-axis direction is substantially the same as the length of the cutout portion 53 in the Z-axis direction.

The restriction portions 74 are sections that respectively project from both end portions of the vertical plate portion 73 in the X-axis direction toward the +Y side. Specifically, the restriction portion 74 is formed in a quadrangular prism shape that is long in the Z-axis direction. A side surface 74A on an inner side in the X-axis direction among side surfaces of the restriction portion 74 faces the above-described side surface 53A in the X-axis direction, in a state in which the tray unit 50 is caused to stand upright in the Z-axis direction. The width of the side surface 74A in the Y-axis direction is made to be substantially the same as the width of the side surface 53A in the Y-axis direction. With this configuration, when the first support member 52 is in a state of being deviated in the X-axis direction, the restriction portion 74 is configured, by making contact with the side surface 53A, so as to restrict the deviation of the first support member 52 in the X-axis direction.

As illustrated in FIG. 10, the rail portion 75 is a section that projects from an outer side end portion of the restriction portion 74 in the X-axis direction toward the outside in the X-axis direction and the +Y side. Furthermore, the rail portion 75 is formed in a quadrangular prism shape that is long in the Z-axis direction. Furthermore, the rail portion 75 has, as an example, a column portion 75A and a protruding portion 75B protruding outward in the X-axis direction from a −Z side end portion of the column portion 75A.

As illustrated in FIG. 8, the rail portion 75 is inserted into the rail guide portion 44, and is movable in the Z-axis direction along the rail guide portion 44.

The annular portion 76 is a section that protrudes toward the +Z side from +Z side end portions of the restriction portion 74 and the rail portion 75. In addition, in the annular portion 76, a through-hole 76A having a circular cross-section which takes the Z-axis direction as the axis direction is formed. The above-described shaft portion 54 is inserted into the through-hole 76A. With this configuration, the support guide member 72 supports the first support member 52 (the tray unit 50) so as to be turnable around the center axis of the shaft portion 54.

Note that, in other words, when viewed from the X-axis direction, the turning of the tray unit 50 means that the tray unit 50 tilts in an oblique direction intersecting with the Z-axis direction.

Here, the support guide member 72 illustrated in FIG. 1 turnably supports the tray unit 50 such that a first position in which the tray unit 50 is positioned in the first manual feed path K3, a second position in which the tray unit 50 is positioned in the second manual feed path K4, and a third position in which the tray unit 50 is accommodated in the accommodation portion 19 are switched. The support guide member 72 itself is guided and held by the rail guide portion 44 (FIG. 8) of the main body frame 32 such that the first position, the second position, and the third position are switched. The rail guide portion 44 is included in an example of a supporting portion.

Note that the switching among the first position, the second position, and the third position of the tray unit 50 will be described later. In addition, in the present embodiment, as an example, the second position and the third position are set to be substantially the same position.

Cover Member

As illustrated in FIG. 2, the cover member 82 is a member arranged so as to cover the +Z side section of the −Y side end portion of the housing 13. Specifically, the cover member 82 includes a cover main body portion 83 and the hinge portions 84 respectively protruding from −Y side end portions of the cover main body portion 83 toward the −Z side.

The length of the cover main body portion 83 in the X-axis direction is substantially equal to the length of the housing 13 in the X-axis direction. A cutout portion 83A cut out toward the +Y side is formed at the center portion in the X-axis direction of the −Y side end portion of the cover main body portion 83. The size of the cutout portion 83A is a size that allows the tray unit 50 to be pulled out in the Z-axis direction and accommodated.

Figure 15A:
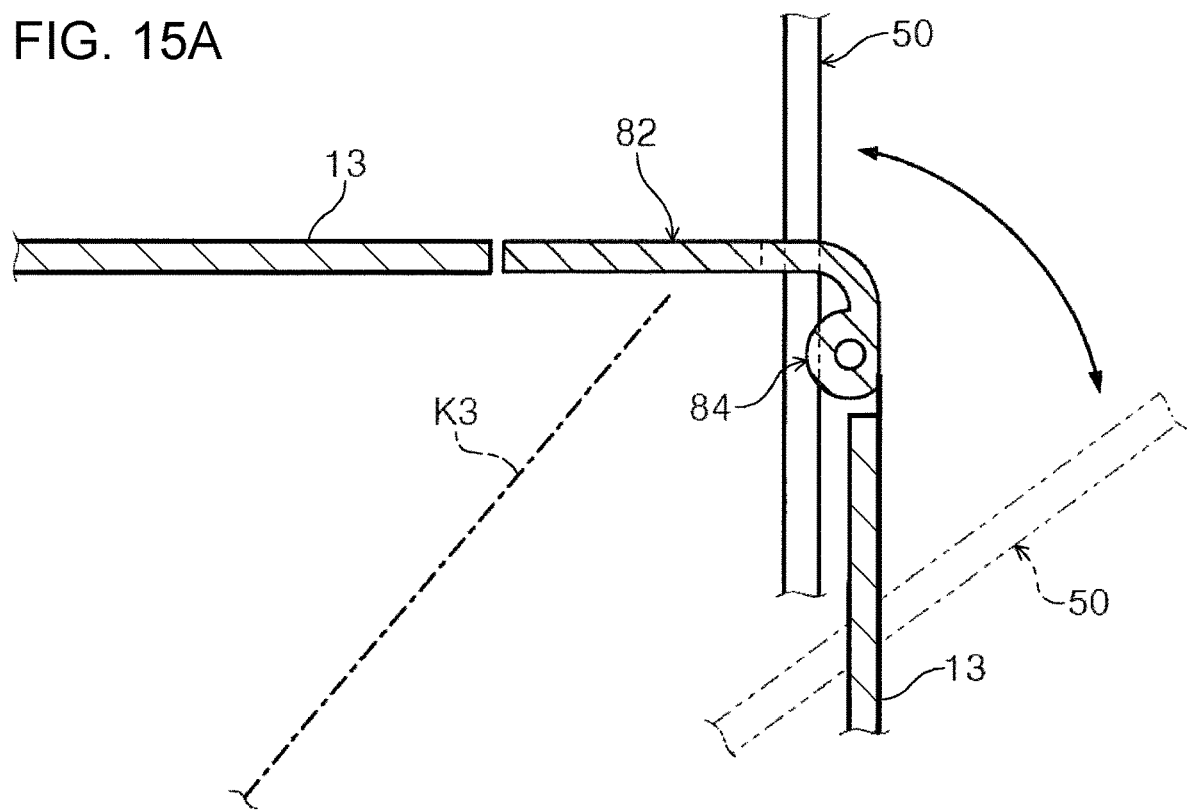
FIG. 15A is a partial side cross-sectional view illustrating a state in which the tray unit is turned in the closed state of the rear cover of the printer according to the first embodiment.

The hinge portions 84 are sections protruding toward the −Z side from sections of the cover main body portion 83 on both outer sides relative to the cutout portion 83A, and are each formed in a circular annular shape with the X-axis direction as a center axis direction (FIG. 15A). Furthermore, the hinge portion 84 is rotatably attached to the above-described attached portion 17C by using a shaft (not illustrated). As described above, the cover member 82 is openably/closably provided to the housing 13 with the hinge portion 84 side as the fulcrum side.

Figure 15B:
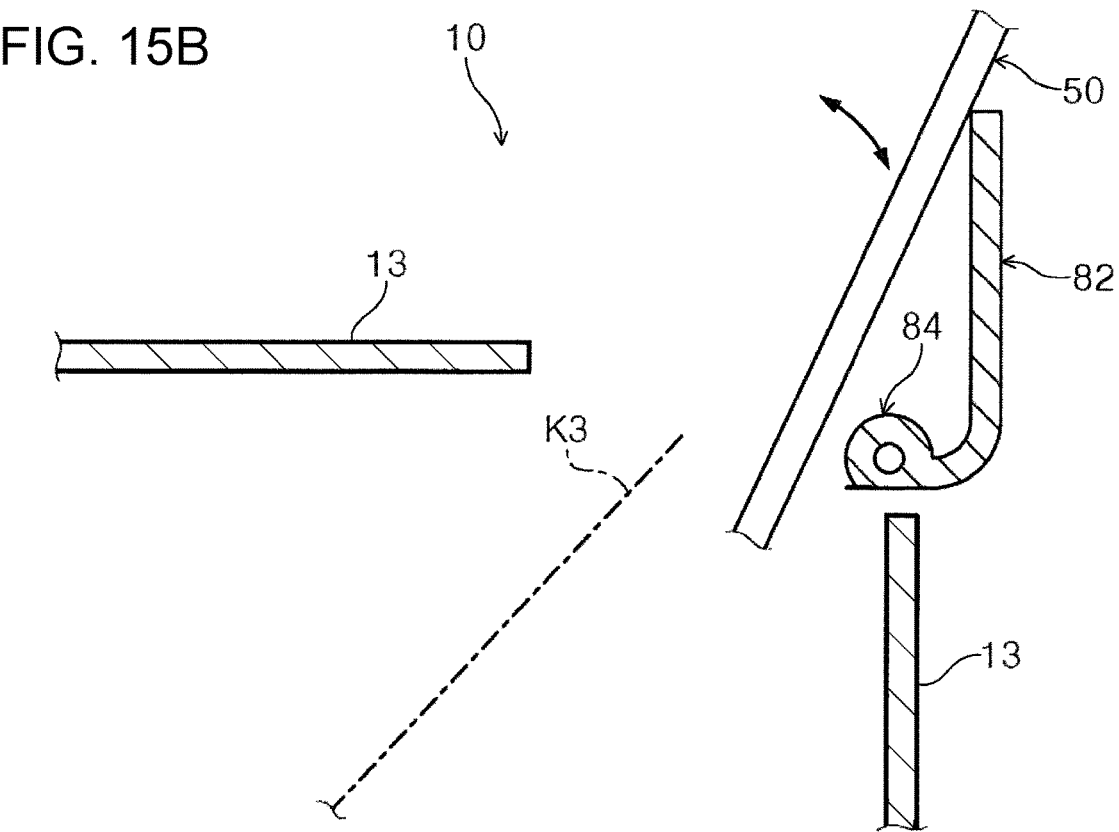
FIG. 15B is a partial side cross-sectional view illustrating a state in which the tray unit interferes with the rear cover in an opened state of the rear cover of the printer according to the first embodiment.

As illustrated in FIG. 15A and FIG. 15B, the cover member 82 is configured, by being pivoted around the hinge portion 84 as the center, so as to be able to open/close the first manual feed path K3. A state in which the cover member 82 covers a +Z side end portion of the housing 13 is referred to as a closed state of the cover member 82. In the closed state, the cover member 82 covers an insertion port side of the paper sheet P of the first manual feed path K3, from the +Z side. That is, in the closed state of the cover member 82, transport of the paper sheet P using the first manual feed path K3 cannot be performed.

As illustrated in FIG. 15B, a state in which the cover member 82 stands upright in the Z-axis direction by the cover member 82 being pivoted around the hinge portion 84 as the center is referred to as an opened state of the cover member 82. In the opened state, the cover member 82 opens the insertion port side of the paper sheet P of the first manual feed path K3. With this configuration, in the opened state of the cover member 82, transport of the paper sheet P using the first manual feed path K3 can be performed. Note that the cover member 82 is, in the opened state, positioned on the −Z side relative to the tray unit 50 pulled out toward the +Z side.

Reversing Unit

Figure 3:
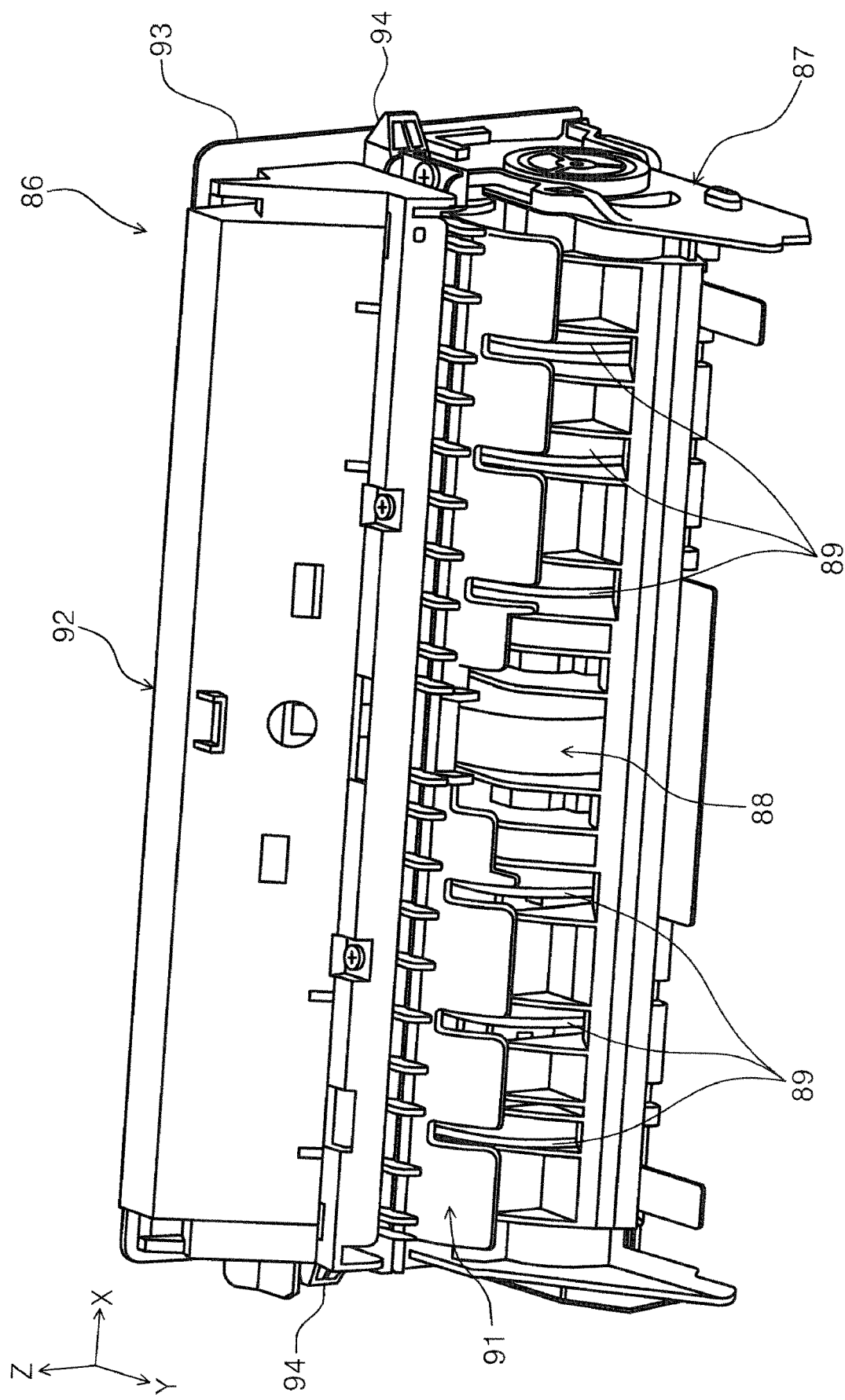
FIG. 3 is a perspective view of a reversing unit of the printer according to the first embodiment.

The reversing unit 86 illustrated in FIG. 3 is an example of a reversing portion, and is provided attachably/detachably to/from the main body frame 32 (FIG. 1). Furthermore, the reversing unit 86 has a function of reversing the front surface and rear surface of the paper sheet P.

Specifically, the reversing unit 86 is configured to include a main body member 87, the reversing roller 88, an auxiliary disk 89, an upper guide member 91, a pedestal member 92, a back surface cover 93, and a movable claw portion 94. Furthermore, the reversing unit 86 is formed in a trapezoidal shape as a whole in which, when viewed from the X-axis direction, the −Y side section stands upright in the Z-axis direction and the +Y side has an acute angle.

In a state in which the reversing unit 86 is attached to the main body frame 32 (FIG. 1), a bottom portion of the reversing unit 86 constitutes the +Z side section of the second manual feed path K4 (FIG. 1).

The reversing roller 88 is provided in the main body member 87 so as to be rotatable around a shaft portion which takes the X-axis direction as a center axis direction, and reverses the front and rear sides of the paper sheet P by being rotated and driven by a motor (not illustrated).

The back surface cover 93 is formed in a plate shape which takes the Y-axis direction as a thickness direction, and is attached to a −Y side section of the main body member 87. In the back surface cover 93, two window portions 93A (FIG. 4) are formed. Furthermore, the back surface cover 93 faces the tray unit 50 (FIG. 1) in the Y-axis direction in the attached state of the reversing unit 86.

In the main body member 87, the movable claw portion 94 is urged so as to be relatively movable in the X-axis direction. Furthermore, the movable claw portion 94 is configured, by being operated in the X-axis direction through the window portion 93A, such that engagement with the main body frame 32 and detachment from the main body frame 32 are possible.

Figure 4:
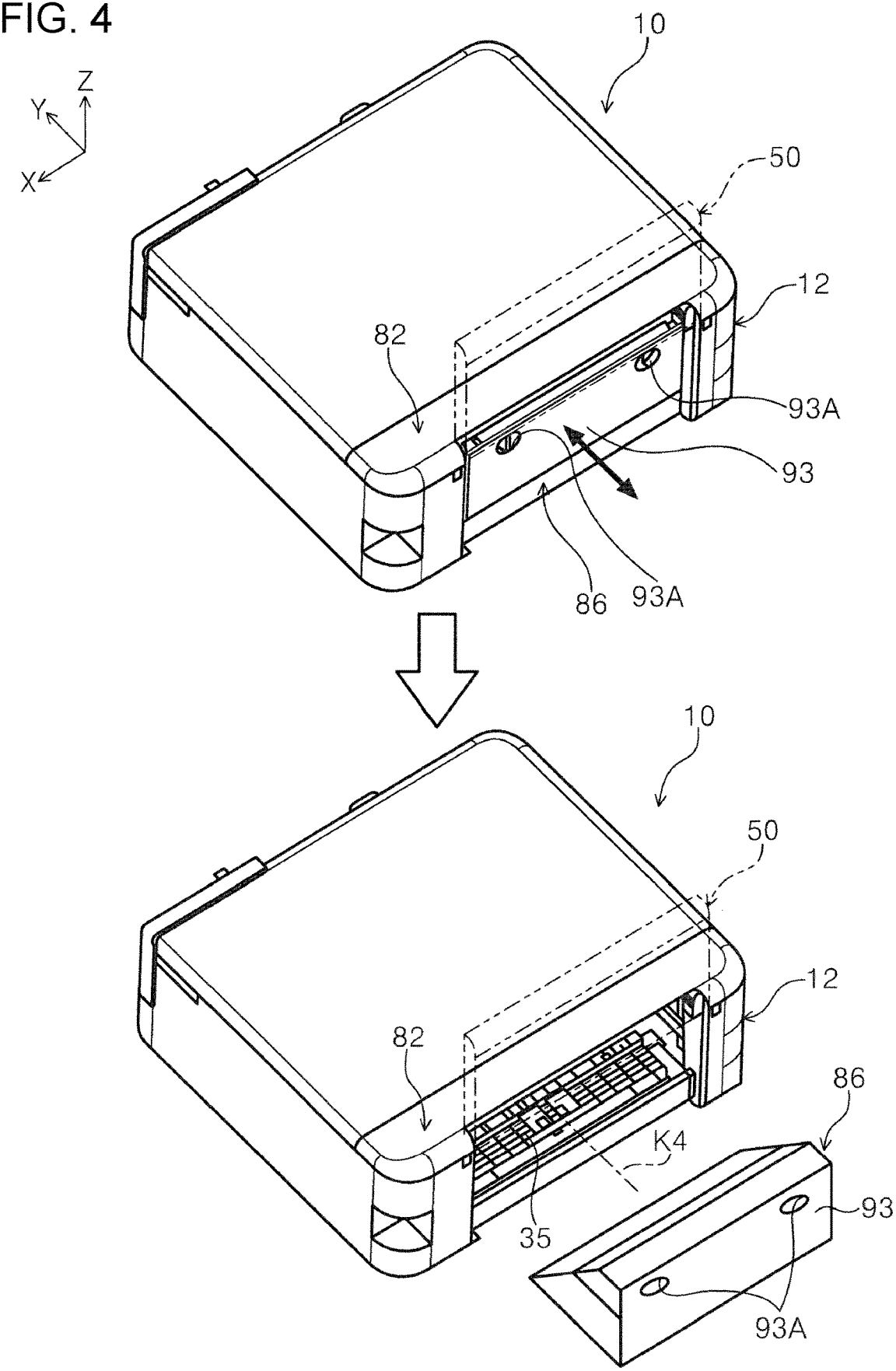
FIG. 4 is a perspective view illustrating a state in which the reversing unit is removed from an apparatus main body of the printer according to the first embodiment.

As illustrated in the upper stage of FIG. 4, the reversing unit 86 is stored inside the main body portion 12 in the use state. Specifically, the reversing unit 86 is, by being attached to the main body frame 32 (FIG. 1), arranged between the guide frame 37 (FIG. 1) and the tray unit 50 in the Y-axis direction. Furthermore, a −Y side section of the reversing unit 86 is exposed by the tray unit 50 being pulled up to the +Z side.

As illustrated in the lower stage of FIG. 4, the reversing unit 86 is detached from the main body frame 32 toward the −Y side by an operation from the −Y side. The second manual feed path K4 is exposed by the detachment of the reversing unit 86. As described above, the reversing unit 86 is made to be attachable/detachable to/from the main body frame 32 by the tray unit 50 being pulled up to the +Z side.

As illustrated in FIG. 1, the reversing unit 86 forms the reverse path K5 for reversing the paper sheet P in the attached state to the main body frame 32, covers the second manual feed path K4 from the +Z side, and is arranged on a path R (the middle stage of FIG. 13) of the turning of the tray unit 50.

The expression "arranged on a path R of the turning of the tray unit 50" means that the reversing unit 86 is positioned downstream in the turning direction relative to the tray unit 50 in a state in which the tray unit 50 is turnable. That is, when the reversing unit 86 is arranged on the path R of the turning of the tray unit 50, the turning of the tray unit 50 is restricted by part of the turned tray unit 50 making contact with the reversing unit 86.

Description of Operations and Effects of First Embodiment

As illustrated in FIG. 2, in the printer 10, when transport of the paper sheet P by manual feed is not performed, the support guide member 72 is positioned at the third position, and the tray unit 50 is in an accommodated state of constituting the wall portion of the printer 10 on the −Y side. At this time, the cover member 82 is positioned along the upper surface of the housing 13, and covers the first manual feed path K3 (FIG. 1). Accordingly, the first manual feed path K3 is unusable.

Use of First Manual Feed Path

By a free end side of the cover member 82 illustrated in FIG. 1 being lifted, a base end side of the cover member 82 is rotated, and the cover member 82 stands upright in the Z-axis direction. As a result, the first manual feed path K3 is opened. In this state, the support guide member 72 is pulled up to the +Z side, whereby the tray unit 50 is also pulled up to the +Z side. Then, in a state in which the support guide member 72 is positioned at the substantially upper end portion of the housing 13, the tray unit 50 is turned.

As illustrated in FIG. 7, the engaging portion 55 of the turned tray unit 50 is engaged with the engaged portion 42 from the −Y side. As a result, as illustrated in FIG. 15B, the first manual feed path K3 can be used in a state in which the tray unit 50 is tilted.

Use of Second Manual Feed Path

Figure 11:
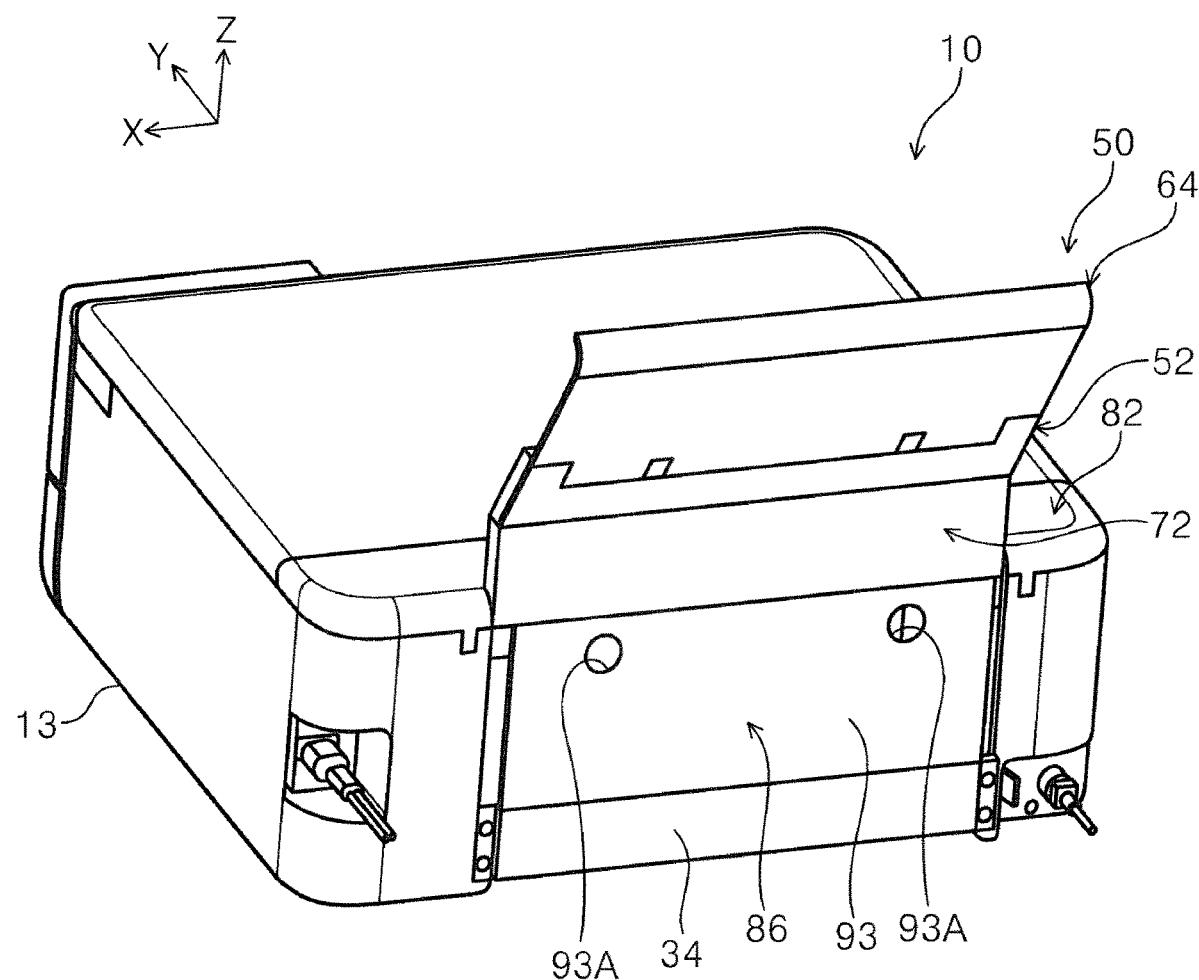
FIG. 11 is a perspective view of an exposed state of the reversing unit of the printer according to the first embodiment when viewed from the back surface side.

The support guide member 72 illustrated in FIG. 2 is pulled up from the third position to the +Z side end portion of the housing 13. As a result, as illustrated in FIG. 11, the reversing unit 86 is exposed, and access to the reversing unit 86 can be performed. In this state, the reversing unit 86 is pulled out to the −Y side.

Figure 12:
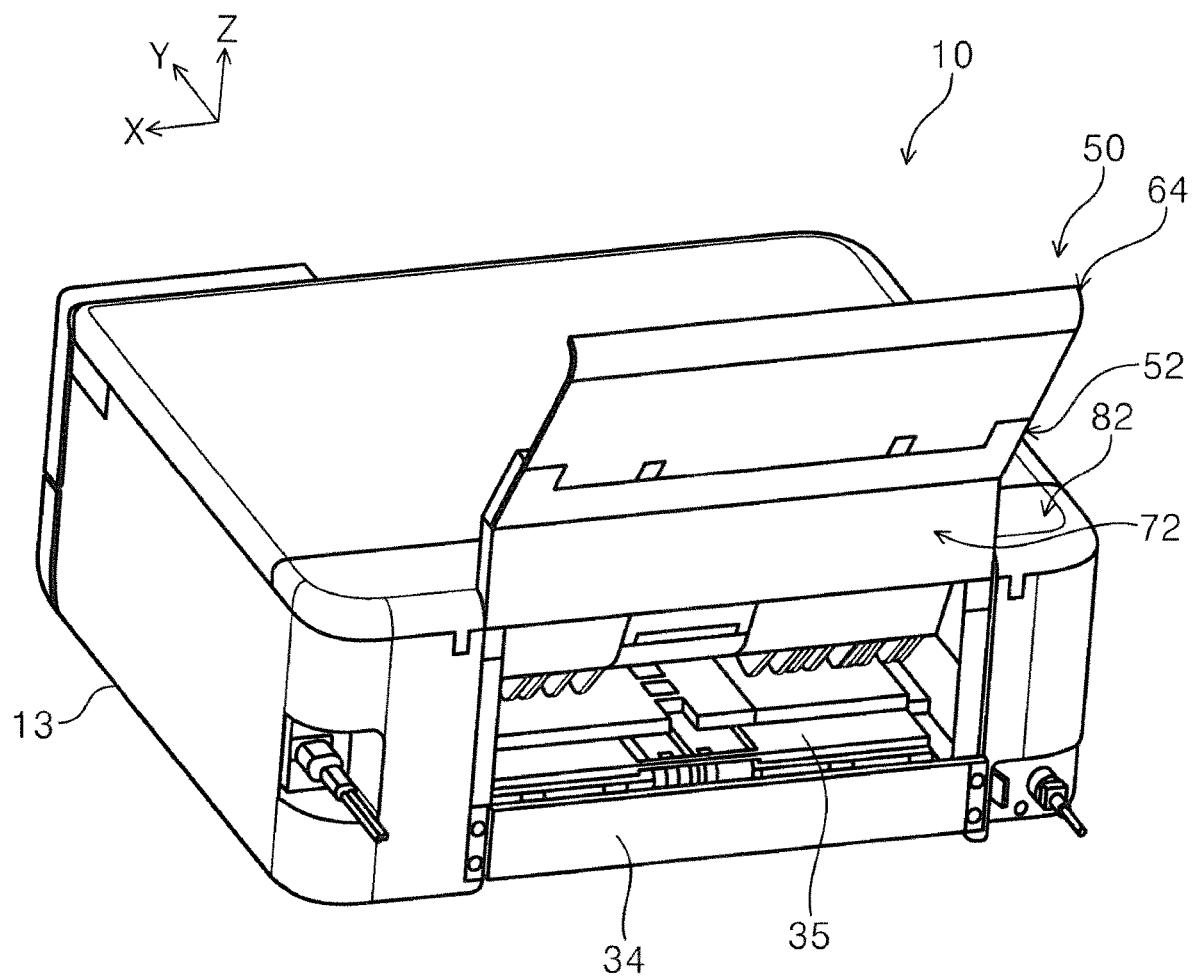
FIG. 12 is a perspective view of an exposed state of a second manual feed path of the printer according to the first embodiment when viewed from the back surface side.
Figure 13:
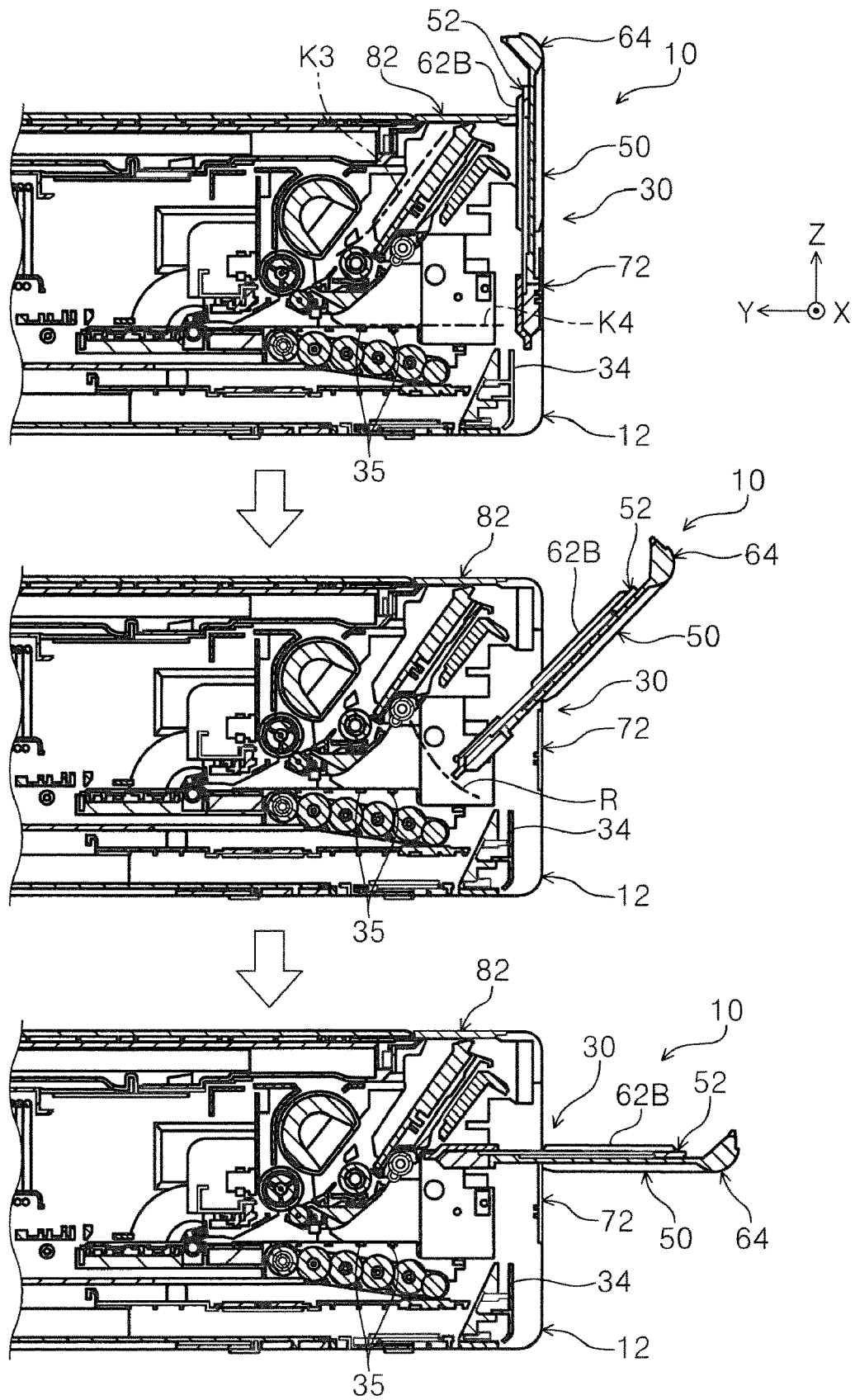
FIG. 13 is a side cross-sectional view illustrating a state in which the tray unit is turned in a closed state of a rear cover of the printer according to the first embodiment.

As illustrated in FIG. 12, in a state in which the lower wall 35 is exposed, the support guide member 72 is pulled down toward the −Z side. At this time, as illustrated in FIG. 13, in a space portion on the lower wall 35 from which the reversing unit 86 (FIG. 11) is removed, the tray unit 50 can be turned.

Figure 14:
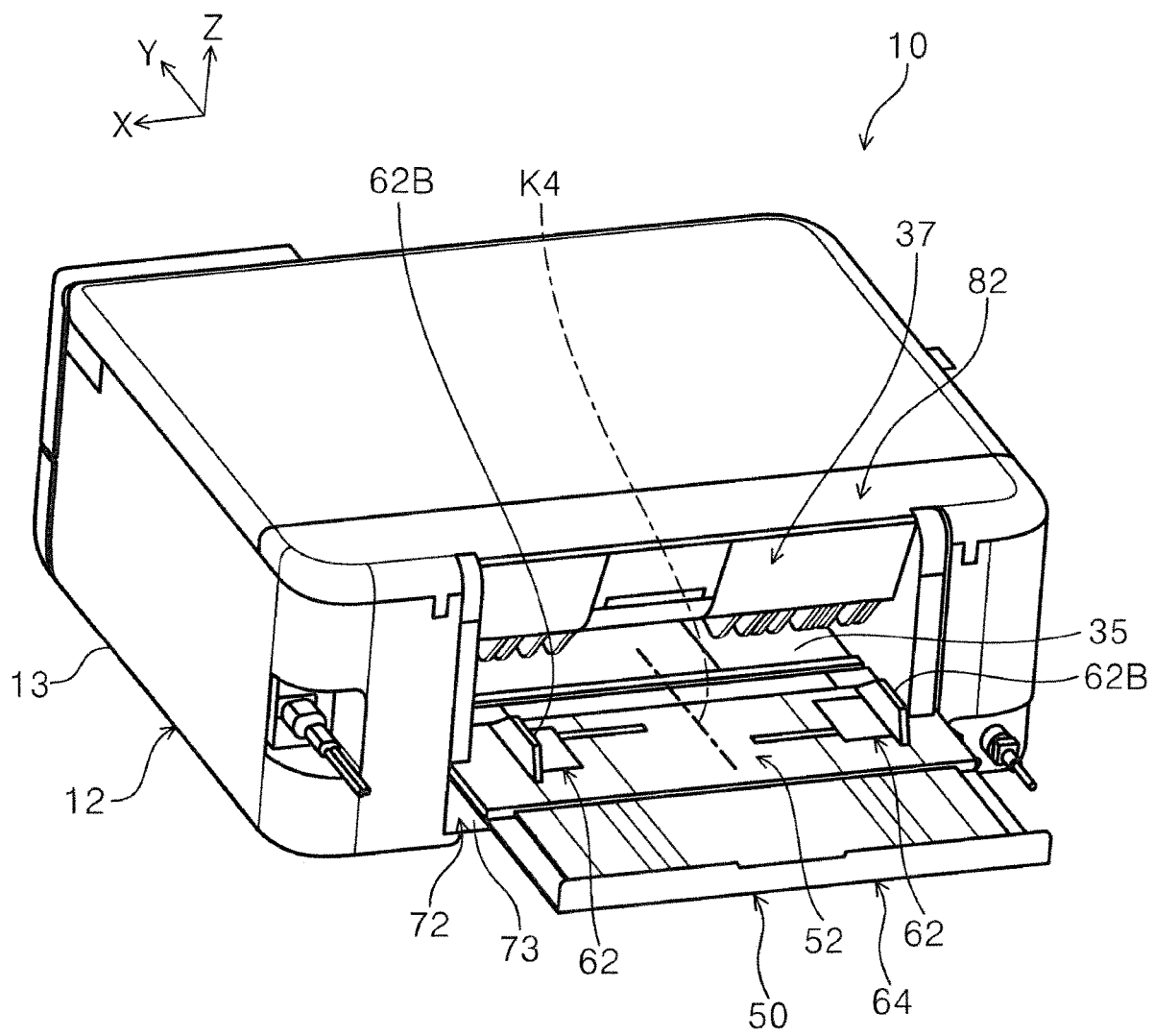
FIG. 14 is a perspective view of a state in which the tray unit is attached to the second manual feed path of the printer according to the first embodiment when viewed from the back surface side.

The tray unit 50 illustrated in FIG. 15A becomes, by being turned, in an arrangement state along the X-Y plane as illustrated in FIG. 14. This arrangement state is held by part of the second support member 64 making contact with the vertical plate portion 73 of the support guide member 72. In this state, by pulling down the support guide member 72 to the −Z side end portion of the housing 13, the lower wall 35 and the tray unit 50 are aligned in the Y-axis direction. That is, the support guide member 72 is positioned at the second position, and the tray unit 50 is arranged along the X-Y plane.

Subsequently, in a state where the second support member 64 is elongated (extended) to the −Y side from the first support member 52, the movable plate 62B is erected on the first support member 52. This makes it possible to use the second manual feed path K4. Note that the support guide member 72 is returned to the third position by performing an inverted procedure of the procedure described above.

As illustrated in FIG. 16, the sheet S mounted on the tray unit 50 passes through the second manual feed path K4 and is fed into the printer 10, and information is recorded thereon by the information recorder 20 (FIG. 1).

(1) As described above, according to the first embodiment, by moving the support guide member 72 in the Z-axis direction, the tray unit 50 is brought into the development state which is the use state from the accommodated state which is the non-use state, and the position of the tray unit 50 in the Z-axis direction is changed. Furthermore, by changing the rotation angle of the turning of the tray unit 50 with respect to the support guide member 72, the posture of the tray unit 50 is changed. As described above, by combining the movement of the support guide member 72 and the turning (posture change) of the tray unit 50, it is possible to switch among the first position, the second position, and the third position of the support guide member 72 and the tray unit 50. This makes it possible to reduce the size of the medium transport portion 30 in comparison with a configuration in which the tray unit 50 is fixed to the main body portion 12 at the second position.

(2) Furthermore, according to the first embodiment, when the reversing unit 86 is detached from the main body portion 12, since an obstacle on the path of the turning of the tray unit 50 is eliminated, the tray unit 50 can be provided in the second manual feed path K4. Furthermore, when the reversing unit 86 is attached to the main body portion 12, since the turning of the tray unit 50 is restricted by the contact with the reversing unit 86, the tray unit 50 cannot be provided in the second manual feed path K4.

That is, when one of the second manual feed path K4 and the reverse path K5 is usable, the other becomes unusable, and it is therefore possible to allow a user to recognize which of the second manual feed path K4 and the reverse path K5 is usable.

(3) Furthermore, according to the first embodiment, when the cover member 82 is in the opened state, the first manual feed path K3 is opened and usable, and the turning of the tray unit 50 is restricted by the contact with the cover member 82 arranged on the lower side relative to the tray unit 50, whereby the second manual feed path K4 becomes unusable.

On the other hand, when the cover member 82 is in the closed state, the first manual feed path K3 is covered by the cover member 82 and unusable, and the turning of the tray unit 50 is permitted, whereby the second manual feed path K4 becomes usable.

That is, when one of the first manual feed path K3 and the second manual feed path K4 is usable, the other becomes unusable, and it is therefore possible to allow the user to recognize which of the first manual feed path K3 and the second manual feed path K4 is usable.

(4) Furthermore, according to the first embodiment, since both the left and right end portions of the paper sheet P or the sheet S are guided in the transport direction by the contact between the edge guide 62 and the paper sheet P, the direction in which the paper sheet P or the sheet S is transported can be stabilized as compared with a configuration without the edge guide 62.

(5) Furthermore, according to the first embodiment, the support guide member 72 is detached from the rail guide portion 44, whereby the tray unit 50 can be taken out from the main body portion 12, and the paper sheet P or the sheet S can be placed on the tray unit 50. The tray unit 50 on which the paper sheet P or the sheet S is placed is provided in any transport path to be used by the rail portion 75 of the support guide member 72 being inserted into the rail guide portion 44. As described above, since the tray unit 50 is attachable/detachable to/from the main body portion 12, it is possible to make it easy for the user to perform an operation of mounting the paper sheet P or the sheet S on the tray unit 50.

(6) Furthermore, according to the first embodiment, by extending the second support member 64 from the first support member 52, the region where the paper sheet P or the sheet S can be mounted in the tray unit 50 expands, and it is thus possible to use the paper sheet P or the sheet S having a large size.

Second Embodiment

Next, a second embodiment as an example of the medium transport apparatus and the processing apparatus according to the present disclosure will be described. Note that components common to those in the first embodiment are denoted by the same reference numerals, and description thereof will be omitted. Furthermore, description of the same actions and effects as those in the first embodiment will be omitted.

Figure 17:
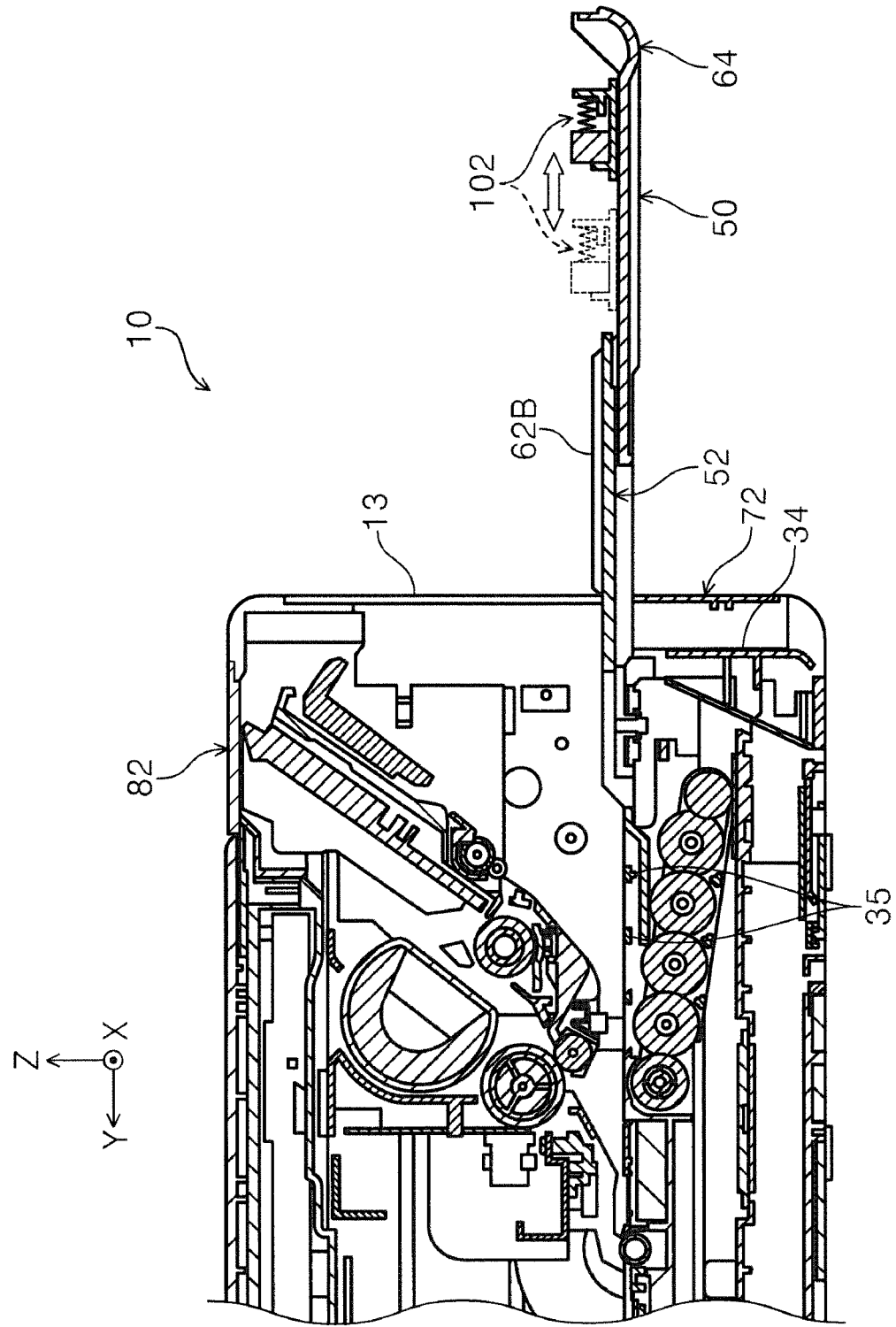
FIG. 17 is a side cross-sectional view of a printer according to a second embodiment.

As illustrated in FIG. 17, in the printer 10, a rear end guide unit 102 may be provided on the second support member 64. The rear end guide unit 102 is an example of an urging portion, and urges the paper sheet P or the sheet S on the tray unit toward the +Y side which is downstream in the transport direction.

Figure 18:
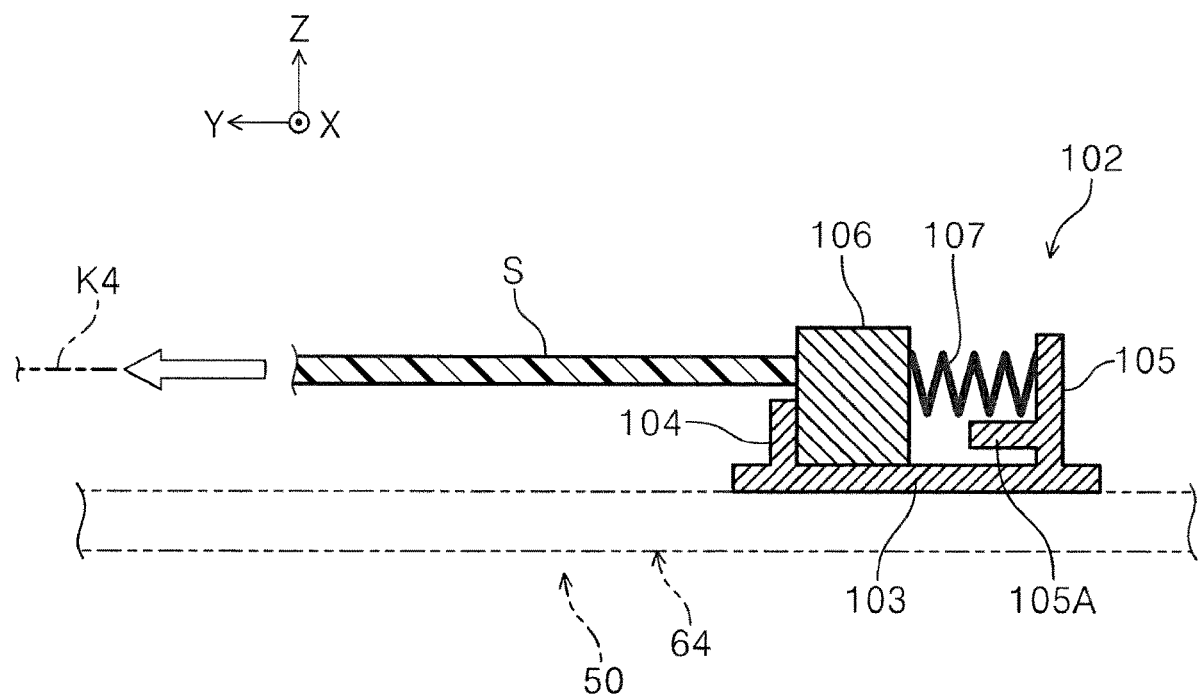
FIG. 18 is a schematic view illustrating a state in which transport force is applied to a paper sheet by a rear end guide member of the printer according to the second embodiment.

As illustrated in FIG. 18, the rear end guide unit 102 includes, as an example, a holder 103, a front wall 104, a rear wall 105, a guide frame 106, and a compression spring 107. Note that the arrangement of each member is described by assuming that the second support member 64 is arranged along the Y-axis direction.

The holder 103 is formed in a plate shape which takes the Z-axis direction as a thickness direction, and is movable in the Y-axis direction (transport direction) along a slit (not illustrated) formed in the second support member 64. Furthermore, the holder 103 is configured such that a position on the second support member 64 is determined by engagement with an engaged portion (not illustrated) formed on the second support member 64.

The front wall 104 stands upright on the +Z side in a +Y side section relative to the center of the holder 103 in the Y-axis direction.

The rear wall 105 stands upright on the +Z side in a −Y side section relative to the center of the holder 103 in the Y-axis direction. Furthermore, a projection portion 105A extending in a plate shape toward the front wall 104 is formed in a −Z side section relative to the center of the rear wall 105 in the Z-axis direction.

The guide frame 106 is a member formed in a prism shape long in the X-axis direction. Furthermore, the guide frame 106 is movable in the Y-axis direction between the front wall 104 and the projection portion 105A.

One end portion of the compression spring 107 is attached to the rear wall 105, and the other end portion thereof is attached to the guide frame 106. With this configuration, the compression spring 107 urges the guide frame 106 toward the front wall 104.

As described above, the rear end guide unit 102 is movable on the second support member 64 along the transport direction of the paper sheet P or the sheet S. Additionally, a −Y side end portion of the paper sheet P or the sheet S mounted on the tray unit 50 makes contact with the guide frame 106, whereby urging force toward the +Y side is applied to the paper sheet P or the sheet S. In other words, the urging force is transport force of the paper sheet P or the sheet S.

Description of Operations and Effects of Second Embodiment (1) According to the second embodiment, the paper sheet P or the sheet S is fed downstream in the transport direction by the urging force received from the rear end guide unit 102. This makes it possible to prevent transport failure in which the paper sheet P or the sheet S stops in the middle of the second manual feed path K4.

Other Embodiments

Although the medium transport portion 30 and the printer 10 according to the embodiments of the present disclosure basically have the above-described configuration, it is of course possible to perform modification, omission, and the like of partial configuration without departing from the essential spirit of the disclosure of the present application.

The printer 10 is not limited to that of an ink jet system, and may be a printer of an electrophotographic system. The medium is not limited to the paper sheet P and the sheet S, and may be a sheet-shaped film.

The processing apparatus is not limited to a recording apparatus such as the printer 10, and may be, as an example, a scanner (information reading apparatus) in which the head 22 is replaced with an image reading portion.

Part of the reverse path K5 may not serve as part of the second manual feed path K4.

The printer 10 may not include the reversing unit 86. In addition, the printer 10 may be configured such that the cover member 82 is not provided, and the first manual feed path K3 is kept exposed. Furthermore, the rail guide portion 44 of the printer 10 may restrict detachment of the rail portion 75.

The tray unit 50 may not be provided with the edge guide 62. For example, a rib may be formed in the first support member 52, and the paper sheet P or the sheet S may be guided by the rib. Furthermore, the tray unit 50 may not include the rear end guide unit 102. Furthermore, the tray unit 50 may have a configuration in which two or more second support members 64 are extendable/retractable from/to the one first support member 52 in the transport direction of the paper sheet P or the sheet S.

The rear end guide unit 102 may be attachable/detachable to/from the tray unit 50. That is, the rear end guide unit 102 may be replaceable to a restriction position set in accordance with the size of the paper sheet P or the sheet S.

In the printer 10, a sensor for detecting attachment/detachment of the support guide member 72 to/from the main body portion 12 may be provided, and when the sensor detects detachment (removal) of the support guide member 72, transition to the manual feed mode may be automatically carried out.

In the printer 10, the tray unit 50 may be urged toward the main body portion 12 such that the accommodated state of the tray unit 50 in the accommodation portion 19 is maintained.

What is claimed is:

1. A medium transport apparatus comprising:
    an apparatus main body having a first transport path and a second transport path different in posture of a medium to be transported; and
    a mount configured to be accommodated in the apparatus main body in a non-use state, wherein
    the mount that is provided in the apparatus main body so as to be configured to move in a height direction of the apparatus main body, and switched among a first position that the mount is positioned in the first transport path, a second position that the mount is positioned in the second transport path, and a third position that is accommodated in the apparatus main body, and
    a rail guide configured to guide a support guide in the height direction and configured to permit movement of the support guide is formed at the apparatus main body.

2. The medium transport apparatus according to claim 1, further comprising:
    the support guide configured to support the mount.

3. The medium transport apparatus according to claim 1, wherein a reversing unit configured to be attached/detached to/from the apparatus main body, configured to form a reverse path configured to reverse a medium in an attached state to the apparatus main body, and arranged on a switch path of a position of the mount is provided.

4. The medium transport apparatus according to claim 3, wherein the reversing unit covers the second transport path in the attached state to the apparatus main body.

5. The medium transport apparatus according to claim 1, wherein
    the mount is provided with an edge guide configured to guide both left and right end portions of a medium in a transport direction in accordance with a width of the medium.

6. The medium transport apparatus according to claim 1, wherein the mount includes a first support supported by the support guide and one or more second supports configured to extend/retract from/to the first support in a transport direction of a medium.

7. A processing apparatus comprising:
    the medium transport apparatus according to claim 1; and
    a central procession unit configured to perform processing on the medium transported in one of the first transport path and the second transport path.

8. A medium transport apparatus comprising:
    an apparatus main body having a first transport path and a second transport path different in posture of a medium to be transported;
    a mount configured to be accommodated in the apparatus main body in a non-use state; and
    a support guide configured to support the mount, wherein
    the mount that is provided in the apparatus main body so as to be configured to move in a height direction of the apparatus main body, and switched among a first position that the mount is positioned in the first transport path, a second position that the mount is positioned in the second transport path, and a third position that is accommodated in the apparatus main body,
    the first transport path is positioned on an upper side relative to the second transport path in the height direction,
    the apparatus main body is provided with a cover configured to open/close the first transport path, and
    the mount is restricted in switching of a position in an opened state of the cover member.

9. The medium transport apparatus according to claim 8, wherein
    the cover covers the first transport path in the closed state, and is positioned on a lower side in the height direction relative to the mount in an opened state.

10. A medium transport apparatus comprising:
    an apparatus main body having a first transport path and a second transport path different in posture of a medium to be transported; and
    a mount configured to be accommodated in the apparatus main body in a non-use state, wherein
    the mount that is provided in the apparatus main body so as to be configured to move in a height direction of the apparatus main body, and switched among a first position that the mount is positioned in the first transport path, a second position that the mount is positioned in the second transport path, and a third position that is accommodated in the apparatus main body, and
    the mount is provided with a rear end guide configured to urge a medium downstream in a transport direction.

* * * * *